(12) United States Patent
Xu et al.

(10) Patent No.: US 11,558,780 B2
(45) Date of Patent: Jan. 17, 2023

(54) METHOD AND APPARATUS FOR USER TRANSFER IN A CLOUD-RADIO ACCESS NETWORK

(71) Applicant: Nokia Solutions and Networks Oy, Espoo (FI)

(72) Inventors: Lei Xu, Zhejiang (CN); Jiaping Yang, Zhejiang (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/954,614

(22) PCT Filed: Sep. 7, 2018

(86) PCT No.: PCT/CN2018/104641
§ 371 (c)(1),
(2) Date: Jun. 26, 2020

(87) PCT Pub. No.: WO2019/119882
PCT Pub. Date: Jun. 27, 2019

(65) Prior Publication Data
US 2020/0314693 A1    Oct. 1, 2020

(30) Foreign Application Priority Data

Dec. 20, 2017  (WO) ................ PCT/CN2017/117512

(51) Int. Cl.
*H04W 72/04*  (2009.01)
*H04W 28/08*  (2009.01)
(Continued)

(52) U.S. Cl.
CPC ......... *H04W 28/08* (2013.01); *H04L 12/4633* (2013.01); *H04L 12/4641* (2013.01);
(Continued)

(58) Field of Classification Search
CPC ............ H04W 28/08; H04W 28/0958; H04W 28/0804; H04W 76/15; H04W 36/02;
(Continued)

(56) References Cited

U.S. PATENT DOCUMENTS

| 2008/0089292 A1* | 4/2008 | Kitazoe | H04L 47/14 370/331 |
| 2008/0254800 A1* | 10/2008 | Chun | H04W 36/0033 455/438 |
| 2013/0343281 A1* | 12/2013 | Bakker | H04W 16/02 370/328 |

(Continued)

FOREIGN PATENT DOCUMENTS

| CN | 101779493 A | 7/2010 |
| CN | 105407057 A | 3/2016 |

(Continued)

OTHER PUBLICATIONS

Kopparty, Vijaykrishna, et al., "Efficient methods for bearer traffic flow migration in NG-RAN", 2018 IEEE Wireless Communications and Networking Conference (WCNC), abstract, 1 pg.

*Primary Examiner* — Mahbubul Bar Chowdhury
(74) *Attorney, Agent, or Firm* — Harrington & Smith

(57) ABSTRACT

Methods and apparatus for user transfer in a Cloud-radio access network (C-RAN) are disclosed. In an embodiment, a method includes in response to a request for migrating a user from a first user equipment (UE) virtualized network function component (VNFC) to a second UE VNFC, receiving at the second UE VNFC, dynamic context information of packet data convergence protocol (PDCP) layer and radio link control (RLC) layer for data transmission of the user from the first UE VNFC. The method further includes continuing process of the data transmission of the user at the second UE VNFC based on the dynamic context information.

20 Claims, 16 Drawing Sheets

<u>1000A</u>

1002: In response to a request for migrating a user from a source UE VNFC to a target UE VNFC, the target UE VNFC receives dynamic context information of PDCP layer and RLC layer for data transmission of the user from the source UE VNFC;

1004: Continue process of the data transmission of the user based on the dynamic context information.

(51) Int. Cl.
*H04W 76/15* (2018.01)
*H04L 12/46* (2006.01)
*H04W 36/02* (2009.01)
*H04W 80/02* (2009.01)
*H04W 36/00* (2009.01)

(52) U.S. Cl.
CPC ... *H04W 28/0804* (2020.05); *H04W 28/0958* (2020.05); *H04W 36/0033* (2013.01); *H04W 36/02* (2013.01); *H04W 76/15* (2018.02); *H04W 80/02* (2013.01)

(58) Field of Classification Search
CPC .............. H04W 80/02; H04L 12/4633; H04L 12/4641; H04L 12/46; H04L 45/64; H04L 45/38
See application file for complete search history.

(56) References Cited

U.S. PATENT DOCUMENTS

| | | | |
|---|---|---|---|
| 2014/0269322 A1* | 9/2014 | Li | H04W 28/08 370/236 |
| 2016/0366009 A1* | 12/2016 | Bedekar | H04L 47/70 |
| 2017/0017512 A1 | 1/2017 | Csatari et al. | |
| 2017/0017514 A1 | 1/2017 | Zhang et al. | |
| 2017/0086111 A1 | 3/2017 | Vrzic et al. | |
| 2017/0104609 A1* | 4/2017 | McNamee | H04L 63/06 |
| 2017/0223701 A1* | 8/2017 | Bendle | H04W 72/1289 |
| 2017/0238171 A1 | 8/2017 | Huang | |
| 2017/0272380 A1 | 9/2017 | Rao et al. | |
| 2020/0196220 A1* | 6/2020 | Centonza | H04W 76/18 |
| 2021/0176676 A1* | 6/2021 | Yang | H04W 36/0066 |

FOREIGN PATENT DOCUMENTS

| | | |
|---|---|---|
| CN | 106462450 A | 2/2017 |
| EP | 3117312 A1 | 1/2017 |
| EP | 3142450 A1 | 3/2017 |
| EP | 3247148 A1 | 11/2017 |
| WO | WO 2015135611 A1 | 9/2015 |
| WO | WO-2015/170834 A1 | 11/2015 |
| WO | WO 2017/156858 A1 | 9/2017 |
| WO | WO 2018/099569 A1 | 6/2018 |
| WO | WO 2018/103826 A1 | 6/2018 |

\* cited by examiner

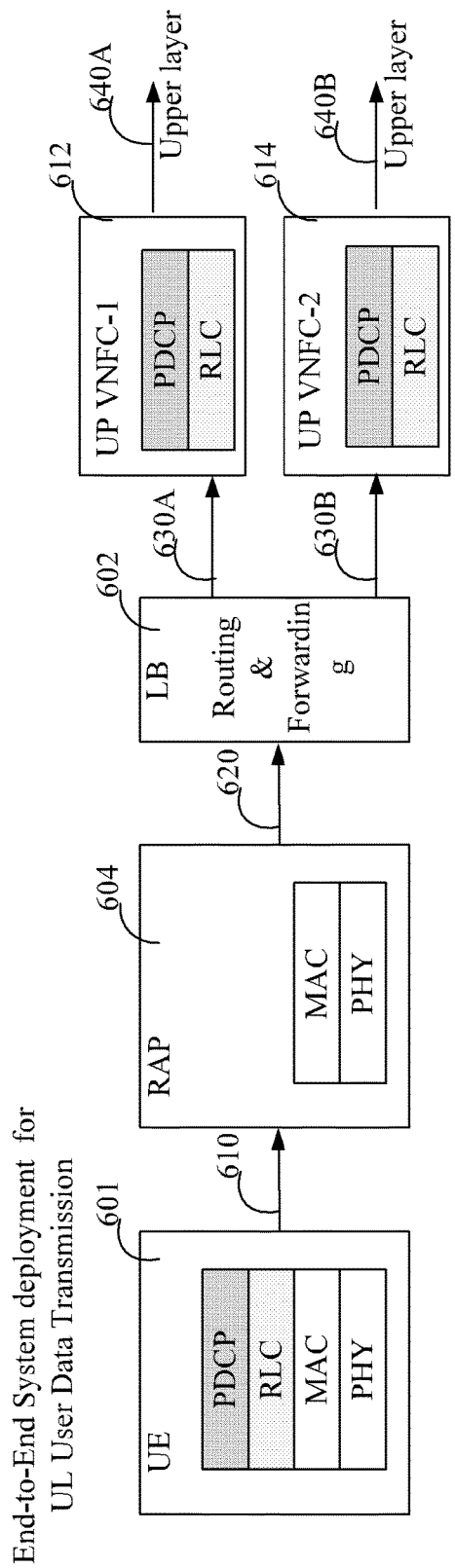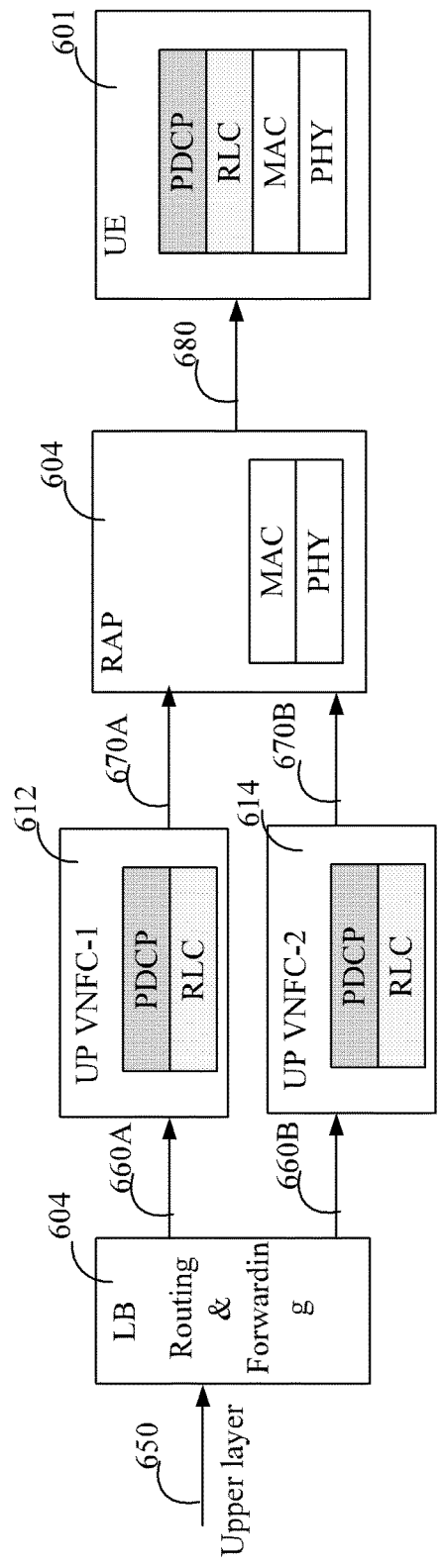
Fig.6

700A

Receiving control plane (CP) data associated with a user from a core network or a remote access point — 702A Dispatching the CP data to a first user equipment(UE) virtualized network function component(VNFC) based on a first route — 704A

Receiving user plane (UP) data associated with a user from a core network or a remote access point — 702B Dispatching the UP data to a second user equipment(UE) virtualized network function component(VNFC) based on a second route — 704B

In response to a request for migrating a user from a source UE VNFC to a target UE VNFC, the target UE VNFC receives dynamic context information of PDCP layer and RLC layer for data transmission of the user from the source UE VNFC;

1004

Continue process of the data transmission of the user based on the dynamic context information.

In response to a request for migrating a user from a source UE VNFC to a target UE VNFC, the source UE VNFC forwards dynamic context information of PDCP layer and RLC layer for data transmission of the user to the target UE VNFC, so that process of the data transmission of the user is able to be continued at the target UE VNFC based on the dynamic context information.

Fig.10B

METHOD AND APPARATUS FOR USER TRANSFER IN A CLOUD-RADIO ACCESS NETWORK

CROSS REFERENCE TO RELATED APPLICATION

This patent application is a U.S. National Stage application of International Patent Application Number PCT/CN2018/104641 filed Sep. 7, 2018, which is hereby incorporated by reference in its entirety, and claims priority to PCT/CN2017/117512 filed Dec. 20, 2017 which is hereby incorporated by reference in its entirety.

TECHNICAL FIELD

Embodiments of the disclosure generally relate to wireless communication, and, more particularly, to method and apparatus for user transfer in a Cloud-radio access network (C-RAN).

BACKGROUND

C-RAN is a novel mobile network architecture where baseband processing is centralized and shared among sites in a virtualized BBU (Building Base band Unit) or user equipment (UE) virtualized network function component (VNFC) Pool. This means that it is able to adapt to non-uniform traffic and utilize resources more efficiently. Due to the fact that fewer UE VNFCs are needed in C-RAN compared to the traditional architecture, C-RAN has also the potential to decrease the cost of network operation, because power and energy consumption are reduced compared to the traditional RAN architecture. New UE VNFC can be added and upgraded easily, thereby improving scalability and easing network maintenance. The UE VNFC Pool can be shared by different network operators, allowing them to rent RAN as a cloud service.

In current C-RAN, UE related control-plane (CP) and user-plane (UP) functionality closely engage with a core network, radio access points and cell specific or central control plane logic etc., which may result in that the procedures of user migration inside C-RAN, UE VNFCs' scale-in/out, rolling upgrade/fall back, load balancing or high availability all have impacts to these "partners" (core network, radio access points, cell specific and central control plane applications) and become much more complex. Therefore, it would be desirable to provide an improved solution for C-RAN.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

According to a first aspect of the disclosure, it is provided a method for user transfer in a Cloud-radio access network (C-RAN). The method comprises in response to a request for migrating a user from a first user equipment (UE) virtualized network function component (VNFC) to a second UE VNFC, receiving at the second UE VNFC, dynamic context information of packet data convergence protocol (PDCP) layer and radio link control (RLC) layer for data transmission of the user from the first UE VNFC. The method further comprises continuing process of the data transmission of the user at the second UE VNFC based on the dynamic context information.

In an embodiment, the second UE VNFC may further receive the request for migrating the user from the first UE VNFC to the second UE VNFC, from a load balancer. The migrating may be determined according to criteria associated with load balancing.

In an embodiment, the second UE VNFC may further fetch static context information for the user.

In an embodiment, the second UE VNFC may further receive new incoming data packets for the data transmission of the user and buffer the new incoming data packets.

In an embodiment, the second UE VNFC may further receive protocol data units of RLC layer which are not delivered by the first UE VNFC for the data transmission of the user. For uplink data transmission of the user, the second UE VNFC may receive protocol data units of RLC layer which are acknowledged but not reassembled by the first UE VNFC. For downlink data transmission of the user, the second UE VNFC may receive protocol data units of RLC layer which are not acknowledged.

In an embodiment, the second UE VNFC may continue process of data transmission of the user by processing the received protocol data unit of RLC layer which are not delivered by the first UE VNFC, and processing the new incoming data packets.

In an embodiment, the dynamic context information may comprise parameters associated with transmission status of the PDCP layer and the RLC layer. In an embodiment, the dynamic context information comprise an indication of a last protocol data unit received at the RLC layer to be processed at the first UE VNFC during the user transfer.

In an embodiment, for uplink data transmission of the user, the dynamic context information can comprise at least one of the following parameters of PDCP layer: a current hyper frame number for the generation of the COUNT values used for PDCP protocol data units received at the PDCP layer from the RLC layer, a next expected sequence number by the PDCP layer, and a sequence number of a last PDCP service date unit delivered to the upper layers.

In an embodiment, for uplink data transmission of the user, the dynamic context information can comprise at least one of the following parameters of RLC layer: receive state variable, maximum acceptable receive state variable, t-reordering state variable, maximum status transmit state variable, and highest received state variable.

In an embodiment, for downlink data transmission of the user, the dynamic context information may comprise at least one of the following parameters of PDCP layer: a sequence number of a next PDCP service date unit, and current hyper frame number for the generation of the COUNT values used for PDCP protocol data units transmitted at the PDCP layer to the RLC layer.

In an embodiment, for downlink data transmission of the user, the dynamic context information may comprise at least one of the following parameters of RLC layer: acknowledgement state variable, maximum send state variable, send state variable, and poll send state variable.

In an embodiment, the RLC layer is on acknowledged mode.

According to a second aspect of the disclosure, it is provided a method for user transfer in a Cloud-radio access network (C-RAN). The method comprises in response to a request for migrating a user from a first user equipment (UE) virtualized network function component (VNFC) to a second UE VNFC, forwarding at the first UE VNFC, dynamic context information of packet data convergence protocol (PDCP) layer and radio link control (RLC) layer for data transmission of the user to the second UE VNFC, so that process of the data transmission of the user is able to be continued at the second UE VNFC based on the dynamic context information.

In an embodiment, the first UE VNFC may further receive the request for migrating the user from the first UE VNFC to the second UE VNFC, from a load balancer. The migrating may be determined according to criteria associated with load balancing.

In an embodiment, the first UE VNFC may further forwards to the second UE VNFC, protocol data units of RLC layer which are not delivered by the first UE VNFC for the data transmission of the user. For uplink data transmission of the user, the first UE VNFC may forward to the second UE VNFC, protocol data units of RLC layer which are acknowledged but not reassembled by the first UE VNFC. For downlink data transmission of the user, the first UE VNFC may forward to the second UE VNFC, protocol data units of RLC layer which are not acknowledged by the first UE VNFC.

According to a third aspect of the disclosure, it is provided an apparatus for user transfer in a Cloud-radio access network (C-RAN). The apparatus comprises a processor; and a memory, the memory containing instructions executable by the processor, whereby the apparatus is operative to in response to a request for migrating a user from a first user equipment (UE) virtualized network function component (VNFC) to a second UE VNFC, receive at the second UE VNFC, dynamic context information of packet data convergence protocol (PDCP) layer and radio link control (RLC) layer for data transmission of the user from the first UE VNFC. The apparatus is operative to continue processing the data transmission of the user at the second UE VNFC based on the dynamic context information.

According to a fourth aspect of the disclosure, it is provided an apparatus for user transfer in a Cloud-radio access network (C-RAN). The apparatus comprises a processor; and a memory, the memory containing instructions executable by the processor, whereby the apparatus is operative to in response to a request for migrating a user from a first user equipment (UE) virtualized network function component (VNFC) to a second UE VNFC, forward at the first UE VNFC, dynamic context information of packet data convergence protocol (PDCP) layer and radio link control (RLC) layer for data transmission of the user to the second UE VNFC, so that process of the data transmission of the user is able to be continued at the second UE VNFC based on the dynamic context information.

According to a fifth aspect of the disclosure, it is provided a computer program product. The computer program product comprises instructions which when executed by at least one processor, cause the at least one processor to perform the method according to the first aspect.

According to a sixth aspect of the disclosure, it is provided a computer program product. The computer program product comprises instructions which when executed by at least one processor, cause the at least one processor to perform the method according to the second aspect.

According to a seventh aspect of the disclosure, it is provided a computer readable storage medium. The computer readable storage medium comprises instructions which when executed by at least one processor, cause the at least one processor to perform the method according to the first aspect.

According to an eighth aspect of the disclosure, it is provided a computer readable storage medium. The computer readable storage medium comprises instructions which when executed by at least one processor, cause the at least one processor to perform the method according to the second aspect.

These and other objects, features and advantages of the disclosure will become apparent from the following detailed description of illustrative embodiments thereof, which are to be read in connection with the accompanying drawings.

BRIEF DESCRIPTION OF THE DRAWINGS

FIG. 6 shows a schematic overview of end-to-end uplink and downlink data transmission according to an embodiment of the present disclosure;

FIG. 7A is a flow chart depicting a method according to an embodiment of the present disclosure;

FIG. 7B is a flow chart depicting a method according to another embodiment of the present disclosure;

FIG. 10A is a flow chart depicting a procedure for user transfer according to another embodiment of the present disclosure;

FIG. 10B is a flow chart depicting a procedure for user transfer according to yet another embodiment of the present disclosure;

DETAILED DESCRIPTION

Figure 1:
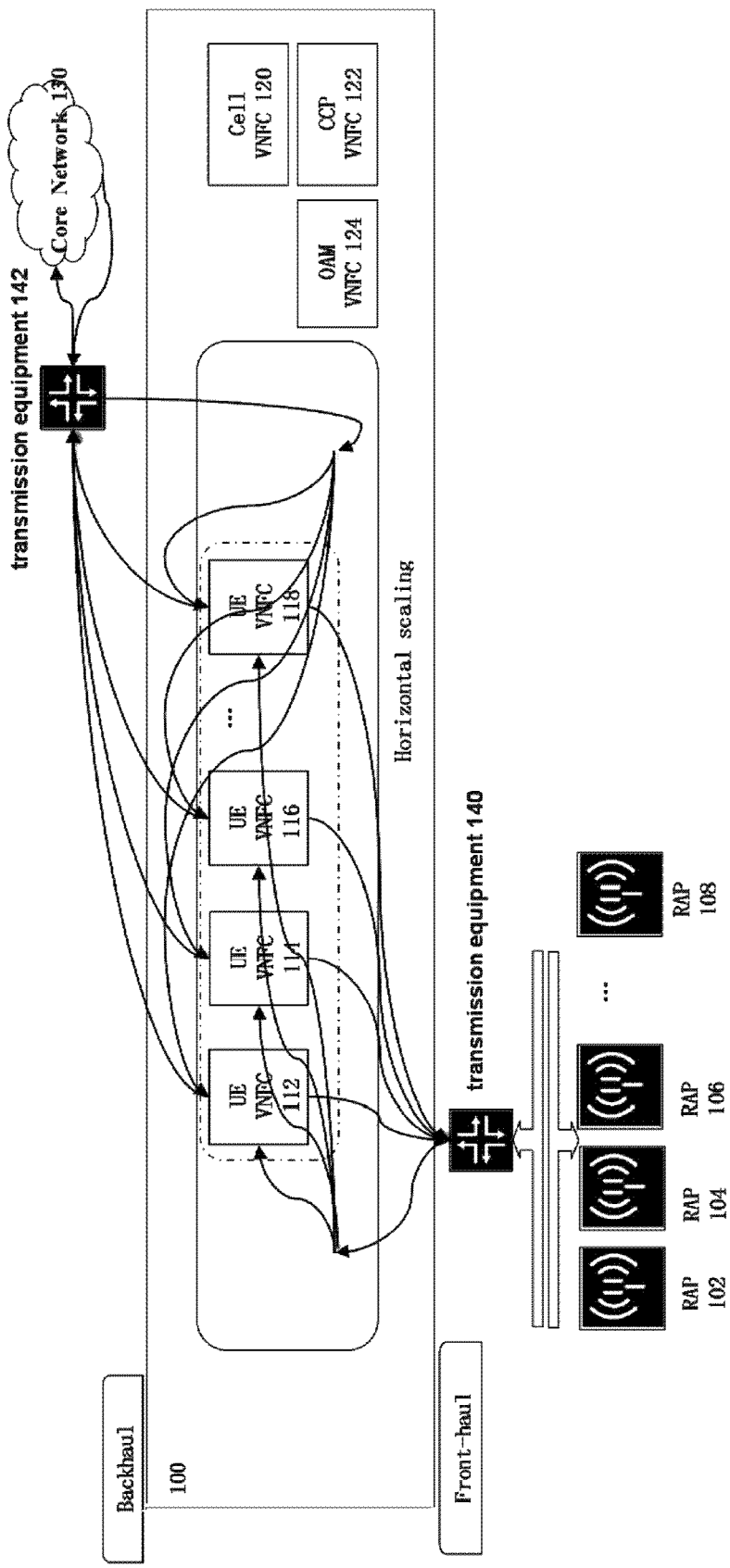
FIG. 1 depicts a schematic LTE system without a load balancer.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "wireless network" or "radio network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device/user equipment (UE) and a network device in the wireless network may be performed according to any suitable generation communication protocols, including, but not limited to, Global System for Mobile Communications (GSM), Universal Mobile Telecommunications System (UMTS), Long Term Evolution (LTE), and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMAX), Bluetooth, and/or ZigBee standards, and/or any other protocols either currently known or to be developed in the future.

The term "network device" refers to a device in a wireless network via which a terminal device accesses the network and receives services therefrom. The network device refers a base station (BS), an access point (AP), or any other suitable device in the wireless network. The BS may be, for example, a node B (NodeB or NB), an evolved NodeB (eNodeB or eNB), or gNB, a Remote Radio Unit (RRU), a radio header (RH), a remote radio head (RRH), a remote access point (RAP), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless network or to provide some service to a terminal device that has accessed the wireless network.

The term "terminal device" refers to any end device that can access a wireless network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless network. Instead, a UE may represent a device that is intended for sale to, or operation by, a human user but that may not initially be associated with a specific human user.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

It is noted that though the embodiments are mainly described in the context of the LTE system, they are not limited to this but can be applied to any suitable wireless system, such as GSM, WCDMA, and other kinds of wireless systems of 5G. Now some exemplary embodiments of the present disclosure will be described below with reference to the figures.

FIG. 1 depicts a schematic LTE system without a load balancer, in which RAN is implemented as C-RAN. In the schematic LTE system, at front-haul, UE VNFCs 112, 114, 116, 118 and RAPs 102, 104, 106, 108 are mesh-connected. When a user is accessed to the LTE radio network through a RAP such as RAP 102, at C-RAN 100, this user can be setup at a UE VNFC such as UE VNFC 112 and RAP 102 communicates with this UE VNFC 112 directly for u-plane or c-plane traffic. For example, a logic user object can be setup for a user at a UE VNFC. Similarly, at backhaul, when a paging for the user comes from a core network 130, a UE VNFC can be selected to setup the user, then this UE VNFC setups GTP (GPRS Tunneling Protocol) tunnel with the core network 130 directly.

Figure 2:
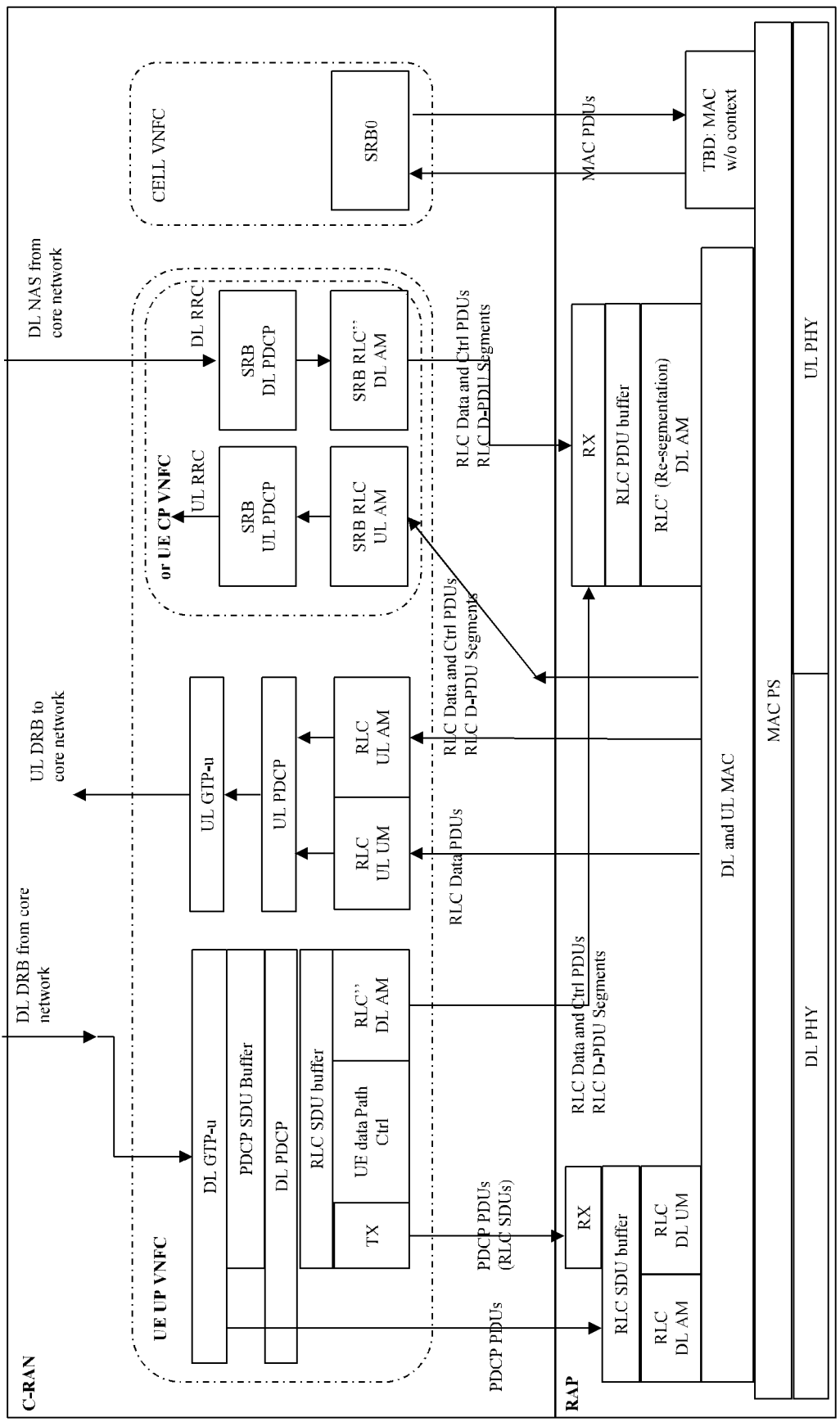
FIG. 2 depicts a schematic protocol stack of the schematic LTE system without a load balancer.

FIG. 2 depicts a schematic protocol stack of the schematic LTE system without a load balancer. As shown in FIG. 2, the traffic from the core network and the RAP is directly sent to the UE CP/UP VNFC. In the C-RAN, UE related CP or UP functionality closely engage with a core network, RAPs and cell specific or central control plane logic etc. There are exposed interfaces between each of these "partners" and UE VNFC. The procedures of user migration inside C-RAN, UE VNFCs' scale-in/out, rolling upgrade/fall back, load balancing or high availability all have impacts to these "partners" (core network, radio access points, cell specific and central control plane applications), to support these procedures, need changes to the UE VNFC, but also need changes in those partners, which is much more complex.

Figure 3:
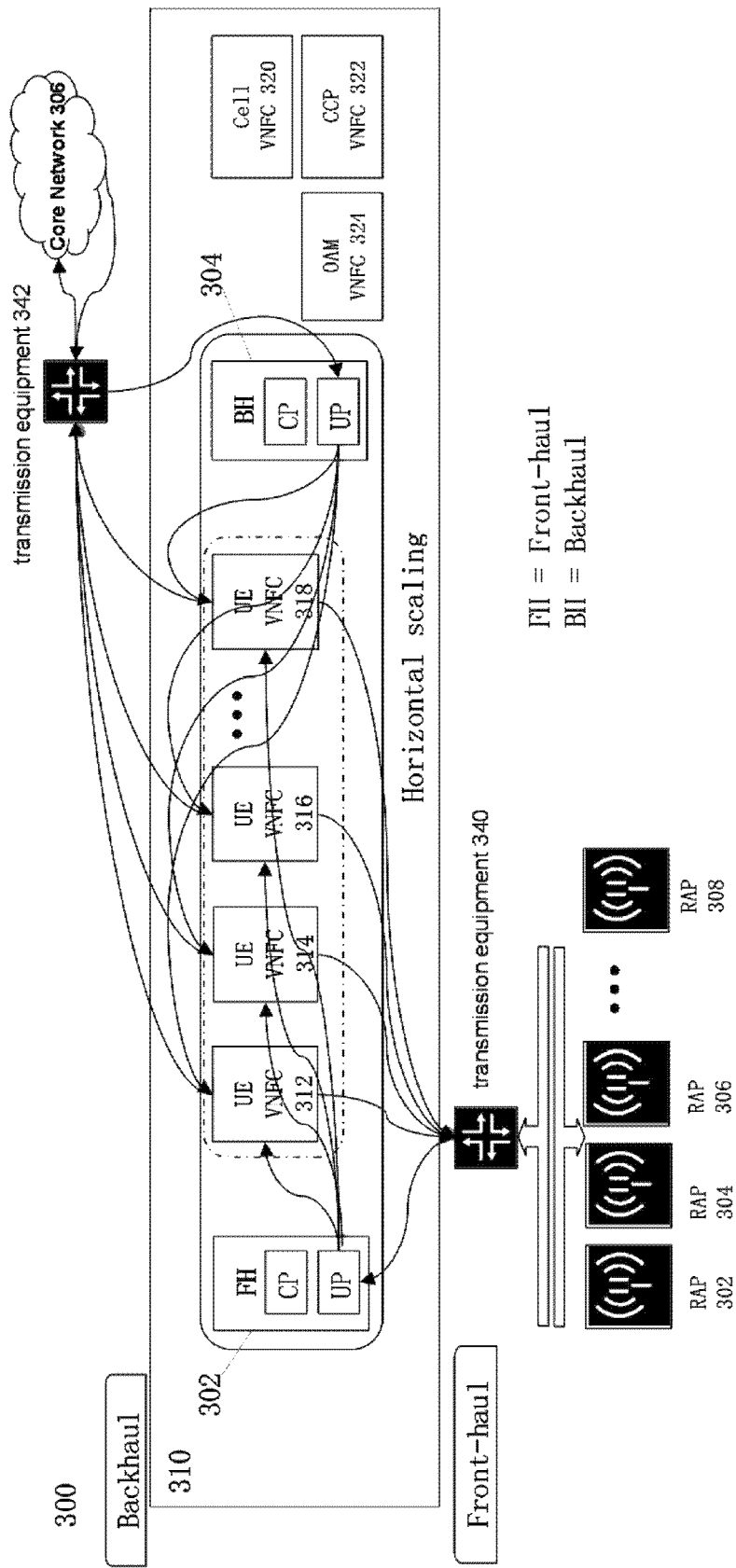
FIG. 3 depicts a schematic system, in which some embodiments of the present disclosure can be implemented.

Load balancers can be deployed for balancing load among multiple UE VNFCs in the C-RAN. The deployment with load balancers may overcome at least one of the drawbacks mentioned above or other drawbacks. FIG. 3 depicts a schematic system 300, in which load balancers are deployed. As shown in FIG. 3, the system 300 comprises a C-RAN 310. The C-RAN 310 may refer to a function element on the network side as compared to a terminal device or UE. For example, the C-RAN 310 may be capable to serve terminal devices such as UEs in the system 300. The C-RAN 310 may comprise load balancers 302 and 304 which can receive user plane (UP) data or control plane (CP) data associated with a user from a core network 306 or a remote access point 302, 304, 306, 308 and dispatch the UP data or CP data to a UE VNFC 312 based on a route which may be created based on a load of one or more UE-VNFCs. It is noted that there may be two or more UE VNFCs though only one UE VNFC 312 is shown in FIG. 3. The load balancers 302 and 304 can be a single apparatus though they are depicted as two separate apparatus. The load balancers can be located at an edge of C-RAN. The load balancers can exist as one or more VNFCs or as a middle ware of the C-RAN 310. Load Balancer provides interface to the core network and remote antenna access units. Load Balancer receives c-plane and u-plane traffic from C-RAN outside and dispatch traffic into VNFCs. In addition, the load balancer or components thereof can be located in the core network or RAP. For example, the dispatching functionality of the load balancer may be implemented by a software defined networking (SDN) traffic forwarding element such as vSwitch which will be described in detail hereinafter. The vSwitch may be located in the core network or RAP.

Figure 4:
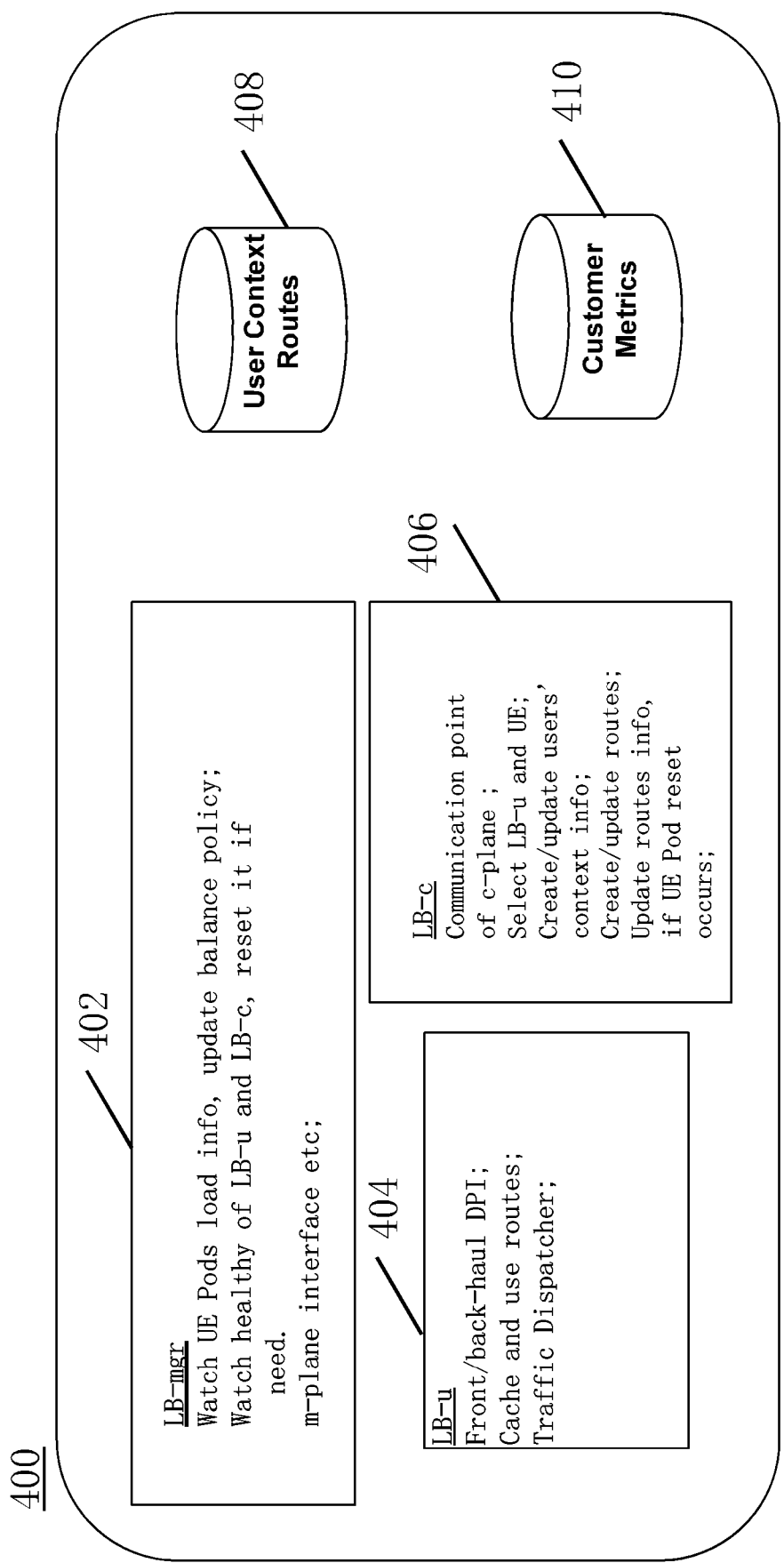
FIG. 4 depicts a schematic load balancer according to an embodiment of the present disclosure.

FIG. 4 depicts a schematic load balancer according to an embodiment of the present disclosure. As shown in FIG. 4, the load balancer 400 comprises a load balancer manager (LB-mgr) 402 which can provide any suitable management functionality. For example, LB-mgr 402 can provide management-plane interface to outside for counters or faults etc.; be responsible to watch the health of the load balancer 400's other components and reset an unhealthy component; read the customer metrics from a database (DB) 410 to watch the load information of the VNFCs; and create a promotion list or update it if such promotion list already exists.

The load balancer 400 further comprises a load balancer control plane (LB-c) 402 which can provide any suitable functionality associated with the control plane. For example, LB-c 406 can act as a messaging communication point for application business logic; based on a promotion list, selects a VNFC to use; keep a session; create routes for traffic dispatch; and save user context into a DB 508. For example, the promotion list may be a list of VNFC loads that are listed in ascending or descending order. Moreover, there may be one or more LB-c 402 though only one LB-c 402 is shown in FIG. 4. For example, LB-c 402 can have horizontal scaling depending on traffic throughput load.

The load balancer 400 further comprises a load balancer user plane (LB-u) 404 which can provide any suitable functionality associated with the user plane. For example, LB-u 404 can dispatch u-plane traffic from RAP or the core network to a correct VNFC, based on the route created by the LB-c 406 and perform deep packet inspection to identify which user owns the packet. In addition, LB-u 404 can be implemented by a SDN vSwitch. Moreover, there may be one or more LB-u 404 though only one LB-u 404 is shown in FIG. 4. For example, LB-u 404 can have horizontal scaling depending on traffic throughput load.

The load balancer 400 further comprises a session DB 408 which may be used to store user static and dynamic contexts information, also the routes information of traffic dispatch and a time-series DB 410 which may be used to store customer metrics of load such as load information of UE VNFCs and LB-u 404. The session DB 408 and the time-series DB 410 can be separate DBs or can be integrated together. Moreover, the session DB 408 and the time-series DB 410 can be implemented by using any suitable DB technology such as Influx DB or Redis DB.

Turn back to FIG. 3, the C-RAN 310 may further comprise one or more UE-VNFCs 312, 314, 316, 318. The UE-VNFCs 312, 314, 316, 318 may provide any suitable functionality associated with UE CP and/or UE UP. For example, the UE-VNFC 312 may provide functionality associated with both UE CP and UE UP, the UE-VNFC 314 may provide functionality associated with UE CP or UE UP, or the like. The UE-VNFCs 312, 314, 316, 318 may be implemented by a virtual machine (VM) or other virtualization techniques (such as container-based virtualization), and may run with any kind of operating system including, but not limited to, Windows, Linux, UNIX, iOS and their variants.

The C-RAN 310 may further comprise a cell VNFC 320 which may serve at least one RAP. It is noted that there may be a plurality of cell VNFCs 320 each of which serves different RAPs though only one cell VNFC 320 is shown in FIG. 3.

The C-RAN 310 may further comprise a centralized control plane (CCP) VNFC 322 which may provide functionality associated with the control plane of the C-RAN 310; and an operation and maintenance (OAM) VNFC 324 which may provide functionality associated with the OAM of the C-RAN 310. In addition, the C-RAN 310 may further comprise any other suitable components.

The system 300 further comprise one or more RAPs 302, 304, 306, 308. It is well known that a cellular radio system may comprise a network of radio cells each served by the RAP, known as a cell site or base transceiver station. The radio network provides wireless communications service for a plurality of more transceivers (in most cases mobile). The network of RAPs working in collaboration allows for wireless service which is greater than the radio coverage provided by a single RAP.

The individual RAP may be connected to the C-RAN through a transmission equipment 340, such as optical transmission device or microwave equipment.

The system 300 further comprise a core network 306 which is a telecommunication network's core part and offers numerous services to the customers who are interconnected by the RAP. For example, in LTE, the core network 306 may comprise Home Subscriber Server (HSS) component, a Packet Data Network (PDN) Gateway (P-GW), a serving gateway (S-GW), a mobility management entity (MME), a Policy Control and Charging Rules Function (PCRF), etc.

Figure 5:
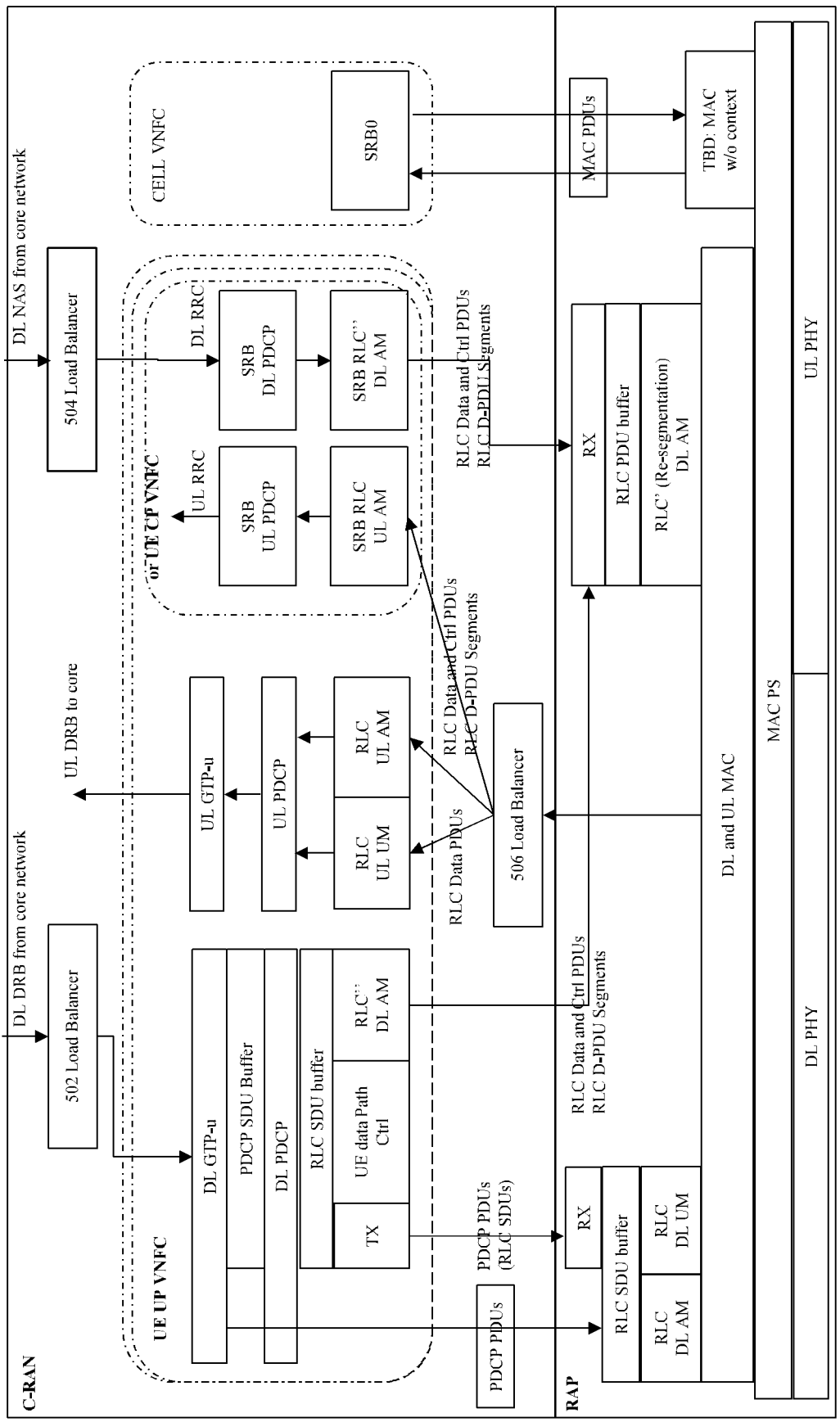
FIG. 5 depicts a schematic protocol stack of a LTE system with a load balancer according to an embodiment of the present disclosure.

FIG. 5 depicts a schematic protocol stack of a LTE system with a load balancer according to an embodiment of the present disclosure. As shown in FIG. 5, the traffic from the core network and the RAP is first sent to the load balancers 502, 504, 506 which may dispatch the traffic to a UE VNFC based on a route, wherein the route may be created based on a load of the one or more UE-VNFCs of the C-RAN. With the load balancers 502, 504, 506, user migrations among UE VNFCs become the load balancer's internal logic, as the load balancer hides user's external connectivity, no tangles with RAP or core network during migration. In addition, thanks to hiding and user migration, the load balancer may make on-demand scaling of UE VNFCs be seamless, the UE VNFCs' scale-out or scale-in are scoped inside the load balancer, no impact to outside RAP or core network etc. Moreover, the load balancer may facilitate UE VNFCs' high availability (N+M) as well. In addition, the load balancer can define an order to do UE VNFCs' rolling upgrade/fallback, without business service downtime. The load balancer may further support a concept of incremental software delivery. With the load balancer, UE service gets different dimensions to trigger on-demand scaling, for example, traffic load, signaling load and active user numbers etc., each map to a different VNFC. The load balancer may benefit compact resource requirement and usage of C-RAN.

FIG. 6 shows a schematic overview of end-to-end uplink and downlink data transmission according to an embodiment of the present disclosure, in which load balancers 612, 614 can be deployed as shown in FIGS. 3-5. UP VNFC is the VNFC used for user-plane traffic processing. It acts as a user-plane resource pool which can be managed by load balancers. The upper part of FIG. 6 shows data processing procedure for uplink data transmission. As shown by the arrow 610, data from UE 601 is received at RAP 604 via a RF interface, and then processed in RAP 604 to terminate PHY and MAC protocol stacks. Then, the data is transferred to a UE VNFC via a functionality entity for routing and forwarding, e.g. a load balancer 602. For example, the load balancer 602 may perform packet inspection, and then forward (630A or 630B) the data to a UE VNFC (e.g. one of UP VNFC-1 612 and UP VNFC-2 614) where currently a user of the UE 601 is allocated to. The UE VNFC performs RLC and PDCP protocols processing, and then transfers (640A or 640B) the data to SGW via a backhaul network.

The lower part of FIG. 6 shows data processing procedure for downlink data transmission. As shown by the arrow 650, downlink data addressed to the UE 601 are received from SGW. Load balancer 604 may be deployed as the exposed backhaul interface to the SGW. The SGW sends the downlink data to the load balancer 604. The load balancer 604 may perform packet inspection, and then forward (670A or 670B) data to a corresponding UE VNFC (UP VNFC-1 612 or UP VNFC-2 614). The corresponding UE VNFC terminates PDCP and RLC protocol stacks, and then sends data to RAP 604. The RAP 604 terminates MAC and PHY protocol stacks. Then, data is sent via a RF interface to the UE 601.

It should be appreciated that the data transmission procedure of FIG. 6 is just an exemplary procedure, and the end-to-end deployment may take many other suitable arrangements. For example, in telecom industry, 4G or 5G's Cloud Radio VNF has one option of functionality split at RLC protocol layer, that is real-time part of RLC functionality running at radio access port which usually is a bare-metal BTS, and non-realtime RLC part running at Cloud VNFC. In those embodiments, a UP VNFC may terminate non-real time RLC and PDCP protocol stack, and the real time RLC protocol stack part can be terminated at RAP.

FIGS. 7A and 7B are flow charts depicting methods according to an embodiment of the present disclosure, which may be performed at an apparatus such as the load balancer as shown in FIGS. 3-6. As such, the apparatus may provide unit for accomplishing various parts of the methods 700A and 700B as well as unit for accomplishing other processes in conjunction with other components.

As shown in FIG. 7A, the method 700A may start at block 702A where the load balancer receives CP data associated with a user from the core network or the RAP. As shown in FIG. 7B, the method 700B may start at block 702B where the load balancer receives UP data associated with a user from the core network or the RAP. For example, at user plane side, an application may create data packets that are processed by protocols such as TCP, UDP and IP, while in the control plane, signaling messages are exchanged between the core network, C-RAN and the UE. The information may be processed by packet data convergence protocol (PDCP), radio link control (RLC) protocol and medium access control (MAC) protocol, before being passed to the physical layer for transmission. The user plane protocol stack between the eNodeB and UE may comprise the following sub-layers: PDCP, RLC and MAC. On the user plane, packets in the core network (such as EPC (Evolved Packet Core)) are encapsulated in a specific EPC protocol and tunneled between the P-GW and the eNodeB. Different tunneling protocols are used depending on the interface. For example, GPRS Tunneling Protocol (GTP) is used on the S1 interface between the eNodeB and S-GW and on the S5/S8 interface between the S-GW and P-GW. The control plane handles radio-specific functionality. For example, the core network such as MME may provide the control plane function for mobility. It is noted that the functionality of the UP and CP may be provided differently in different wireless network. As shown in block 702A and block 702B, the load balancer may receive only CP data, only UP data or both CP data and UP data associated with the user.

At block 704A, the load balancer dispatches the CP data to a first UE VNFC based on a first route. At block 704B, the load balancer dispatches the UP data to a second UE-VNFC based on a second route. The load balancer may generate the route based on a route policy defined by a network administrator for example. The route policy may include a mechanism for selectively applying policies based on access list, user priority, QoS (quality of service), data size, data type, UE VNFC load or other criteria. For example, if the data type is CP data, then the route for the CP data is to the UE CP VNFC. Similarly, if the data type is UP data, then the route for the UP data is to the UE UP VNFC. As another example, if the user has a higher priority, then the route for the data from/to the user may be to the UE VNFC with higher availability. The first UE-VNFC may be same as or different from the second UE-VNFC. For example, if the first UE VNFC processes only the CP data and the second UE-VNFC processes only the UP data, then the first UE-VNFC may be different from the second UE-VNFC. In another example, if a UE-VNFC can process both the CP data and the UP data, then the first UE-VNFC and the second UE-VNFC may be the same UE-VNFC.

In an embodiment, the route is created based on a load of the one or more UE-VNFCs. For example, if there is not a route for the received UP data or CP data, the load balancer may generate the route to the UE VNFC with lowest current load for the received UP data or CP data.

Figure 16:
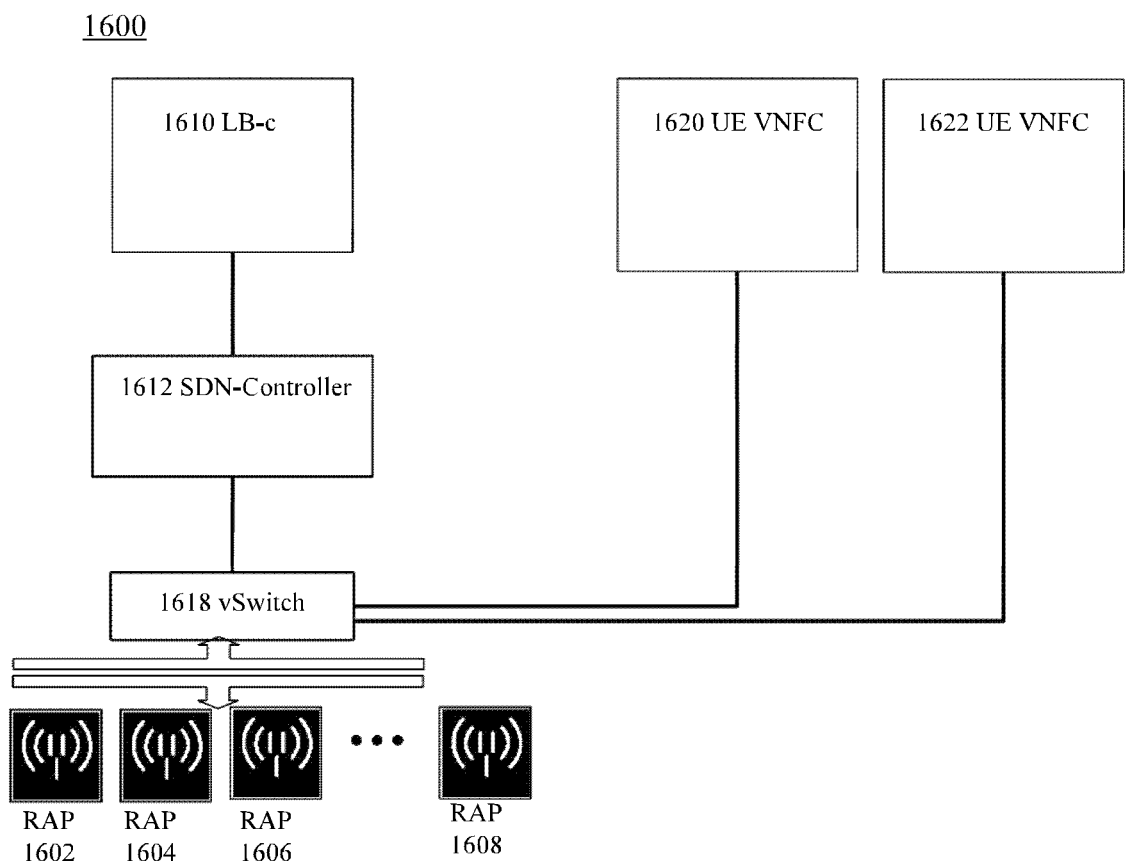
FIG. 16 depicts a schematic system, in which the dispatching functionality of the load balancer is implemented by a SDN vSwitch.

Since before reaching application business logic such as UE VNFC, the traffic may go through the load balance which may result in an additional hop, so extra delay may be added and a new single point of failure may be caused. In an embodiment, the dispatching functionality of the load balancer may be implemented by a software defined networking (SDN) traffic forwarding element such as vSwitch. FIG. 16 depicts a schematic system, in which the dispatching functionality of the load balancer is implemented by the SDN vSwitch. As shown in FIG. 16, LB-c 1610 tells routing rules to a SDN controller 1612 through a SDN northbound interface (NBI), which configures a flow table to vSwitch 1618, then for incoming traffic, vSwitch 1618 may dispatch them to correct UE VNFCs directly. There may be no extra hop and no extra delay any more. In addition, the traffic may be IPSec (IP Security) decrypted before dispatched by the vSwitch 1618. It is noted that there may be a plurality of vSwitchs 1618 each of which may serve at least one RAP.

Figure 8:
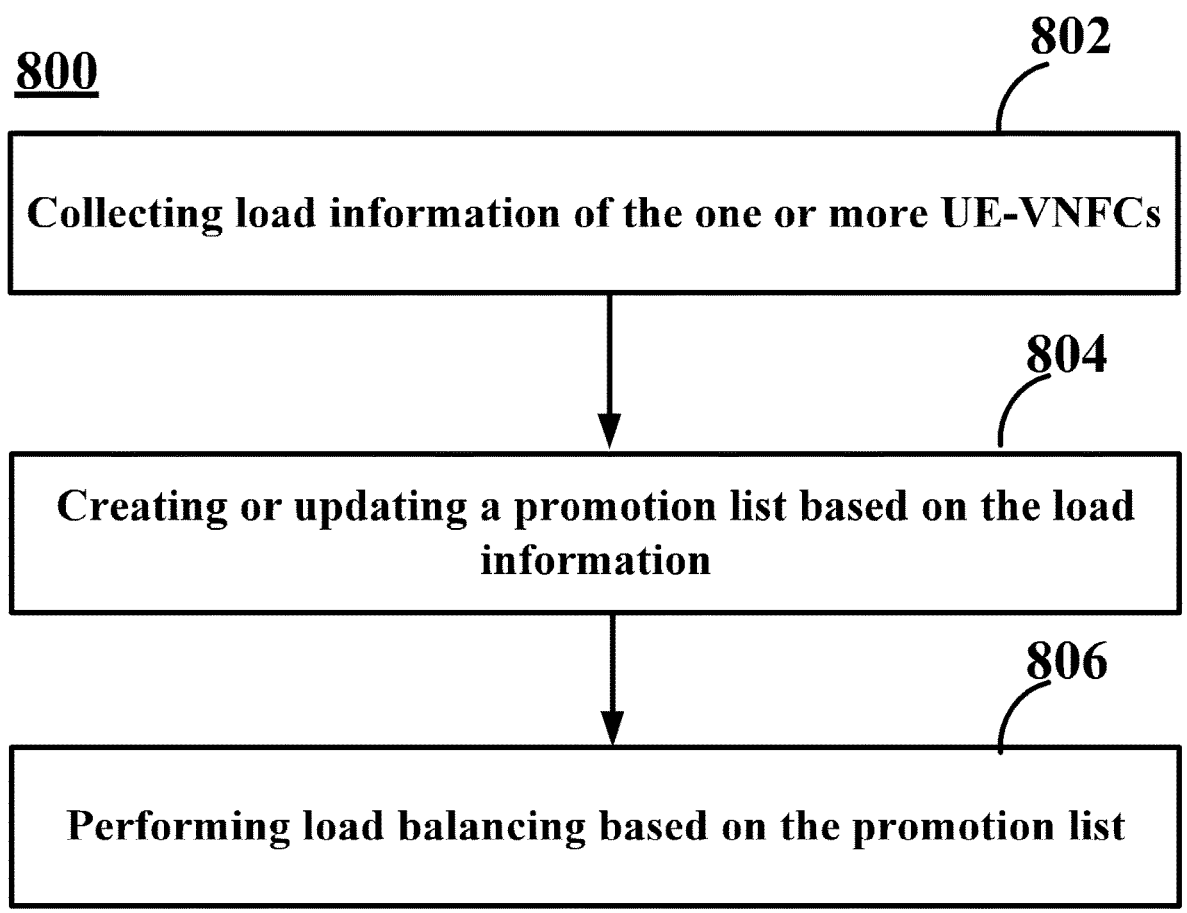
FIG. 8 is a flow chart depicting a method according to another embodiment of the present disclosure.

FIG. 8 is a flow chart depicting a method 800 according to an embodiment of the present disclosure, which may be performed at an apparatus such as the load balancer as shown in FIGS. 3-6. As such, the apparatus may provide unit for accomplishing various parts of the method 800 as well as unit for accomplishing other processes in conjunction with other components.

As shown in FIG. 8, at block 802, the load balancer collects load information of the one or more UE-VNFCs. For example, the load balancer may periodically collect load information of the one or more UE-VNFCs. Alternatively, the one or more UE-VNFCs may report their load information to the load balancer periodically or based on a predefined event, such as the changed load information or in response to a request for the load information.

At block 804, the load balancer creates or updates a promotion list based on the load information. The promotion list may be a list of VNFC loads that are listed in ascending/descending order.

At block 806, the load balancer performs load balancing based on the promotion list. For example, the route may be created based on the promotion list. As an example, if there is not a route for the received UP data or CP data, the load balancer may select the UE VNFC with the lowest load from the promotion list and generate the route to the selected UE VNFC for the received UP data or CP data.

In an embodiment, the load balancer may save the user's context information which comprises static context information and CP context information. The user's static context may be created or modified during user/bearer setup and may comprise user ID, UE ID, service type, etc. The dynamic context be created or updated during per packet processing and may comprise PDCP sequence number, RLC buffers, etc. For example, during the user accesses to the LTE network, LB-c of the load balancer may store static context of this user into the session database, and the UE VNFC may update the user's dynamic context into the same session database. Usually only user's SRB (signaling radio bearers) related dynamic context may be saved, DRB (data radio bearers) related dynamic context may not be saved, due to performance limit of database's write and read.

In an embodiment, the load balancer may perform deep packet inspection (DPI). DPI can examine the data part of a packet as it passes the load balancer, searching for protocol non-compliance, viruses, spam, intrusions, or defined criteria to decide whether the packet may pass or if it needs to be routed to a different destination, or for the purpose of collecting statistical information. In an embodiment, DPI may be used to identify which user owns the packet.

For VNFC, it has cloud specific characteristic, such as scaling, load balance, rolling upgrade etc. These procedures would need to migrate setup users among the VNFCs. For example, during a scale-in procedure for a VNFC, for the setup users already on this VNFC, the VNFC has to either wait autonomic call drop of these users, or migrate them to a target VNFC. Only when no users existing on this old VNFC anymore, this VNFC can be deleted.

For the user migration, one requirement is that there is no packet loss and no call drop during the user migration. Currently, there is no user migration solution available in Cloud BTS VNF. Users cannot be transferred between user-plane (UP) VNFCs. Thus, currently, it is impossible to provide users load balancing among UP VNFCs without service downtime. In addition, with regard to VNFC scaling in, the traditional solution would require all users in a corresponding VNFC to be released first, and only after that the VNFC could be deleted.

This disclosure is to resolve this requirement based on RLC/PDCP layer context forwarding and RLC PDU forwarding. User migration can be performed between two UE VNFCs, with RLC and PDCP protocol layers' user context and buffered data forwarding between source UE VNFC and target UE VNFC. In addition, based on the strength of load balancer, user migration can be transparent to core network and/or to user terminal, and thus achieves smarter and faster migration.

Figure 9:
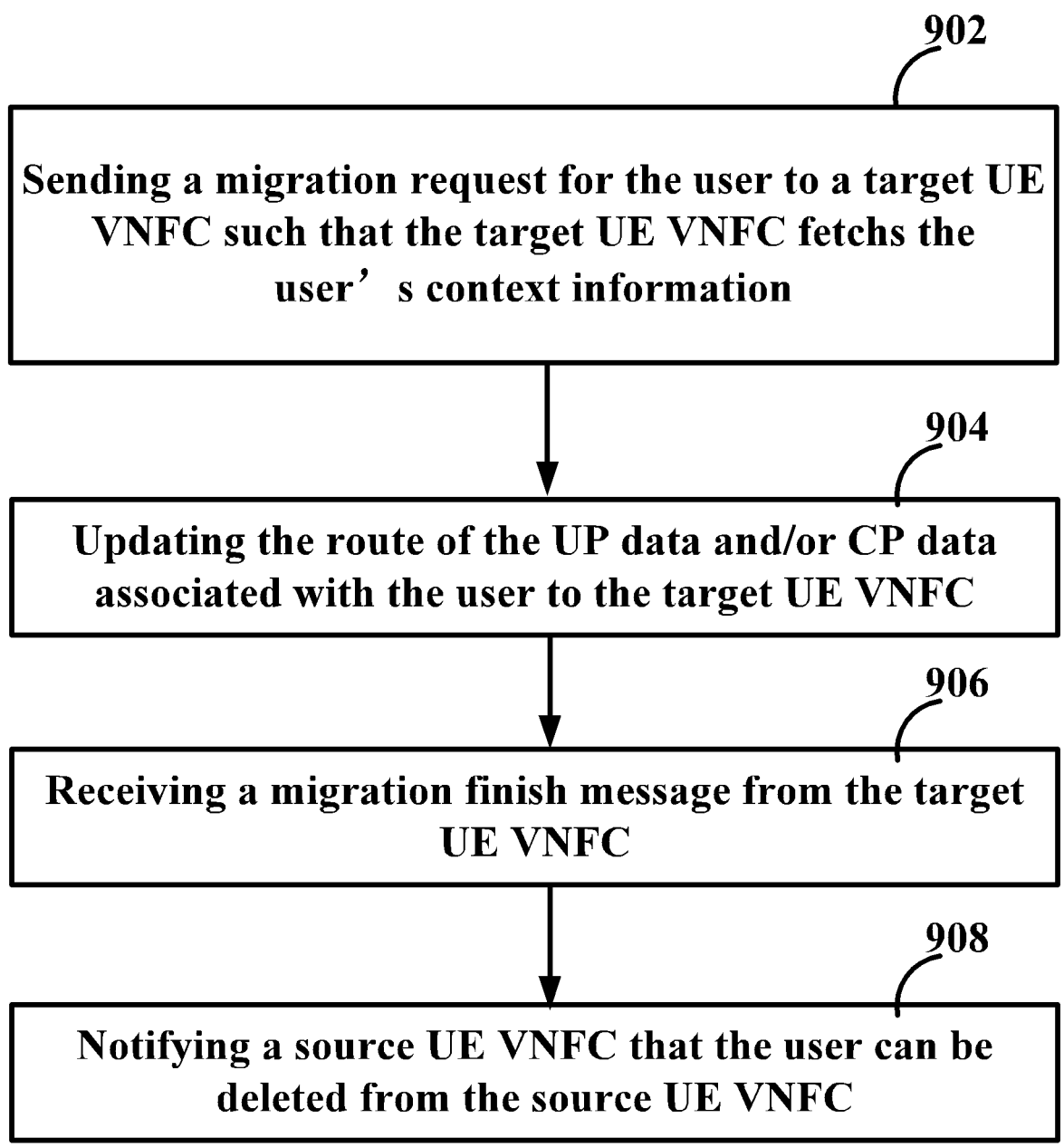
FIG. 9 is a flow chart depicting a procedure for user transfer according to an embodiment of the present disclosure.

FIG. 9 is a flow chart depicting a method for user migration according to an embodiment of the present disclosure, which may be performed at an apparatus such as the load balancer as shown in FIGS. 3-6. As such, the apparatus may provide unit for accomplishing various parts of the method 900 as well as unit for accomplishing other processes in conjunction with other components. In this embodiment, the load balancer can migrate a user from a source UE VNFC to a target UE VNFC.

As depicted in FIG. 9, at block 902, the load balancer sends a migration request for the user to a target UE VNFC such that the target UE VNFC fetches the user's context information. The migration request may comprise any suitable information such as the address of the source UE VNFC. The target UE VNFC may fetch the user's static context information from the session database of the load balance and fetch the user's dynamic context information from the source UE VNFC. Alternatively, the load balancer may trigger the user's context information forwarding to the target UE VNFC.

At block 904, the load balancer updates the route of the UP data and/or CP data associated with the user to the target UE VNFC. For example, if the source UE VNFC processes only the UP data associated with the user, then the load balancer updates the route of the UP data associated with the user to the target UE VNFC; if the source UE VNFC processes only the CP data associated with the user, then the load balancer updates the route of the CP data associated with the user to the target UE VNFC; and if the source UE VNFC processes both the UP data and the CP data associated with the user, then the load balancer updates the route of both the UP data and the CP data associated with the user to the target UE VNFC.

At block 906, the load balancer receives a migration finish message from the target UE VNFC. For example, when the target UE VNFC restores the user's context information and continues processing the UP data and/or CP data associated with the user, the target UE VNFC may send the migration finish message to the load balancer.

At block 908, the load balancer notifies the source UE VNFC that the user can be deleted from the source UE VNFC.

FIG. 10A is a flow chart depicting a method 1000A for user transfer according to an embodiment of the present disclosure, which may be performed at an apparatus such as the UE VNFC as shown in FIGS. 1-3 and 5-6. As such, the apparatus may provide unit for accomplishing various parts of the method 1000A as well as unit for accomplishing other processes in conjunction with other components. In this embodiment, the user can be migrated from a source UE VNFC to a target UE VNFC.

As shown in method 1000A of FIG. 10A, at block 1002, in response to a request for migrating a user from the source UE VNFC to the target UE VNFC, the target UE VNFC receives dynamic context information of PDCP layer and RLC layer for data transmission of the user from the source UE VNFC. In an embodiment, a migration request may be sent from a load balancer to the target UE VNFC. The migration request may comprise any suitable information, such as the address of the source UE VNFC. Then the target UE VNFC may fetch the user's dynamic context information from the source UE VNFC. Additionally, the target UE VNFC may further fetch the user's static context information from a session database of the load balance. The dynamic context may comprise information updated per packet processing, e.g. PDCP sequence number, RLC buffers information etc. The static context information may comprise static and semi-static information about the user, such as profiles created or modified during user/bear setup or reconfiguration phase. Alternatively, the load balancer may trigger the user's context information forwarding to the target UE VNFC.

Then, at block 1004, the target UE VNFC continues process of the data transmission of the user based on the dynamic context information. With the dynamic context information of PDCP layer and RLC layer, the source UE VNFC can recover the dynamic context into its RLC and PDCP protocol entity, without RLC and PDCP re-establishment. Based on the further static context information, static and semi-static context of the UE is synchronized between the two VNFCs via the data base, so that the total time for migration can be reduced remarkably.

Method 1000B of FIG. 10B is a flow chart depicting a method for user transfer according to an embodiment of the present disclosure, from the perspective of the source UE VNFC. As such, the apparatus may provide unit for accomplishing various parts of the method 800 as well as unit for accomplishing other processes in conjunction with other components. At block 1006, the source UE VNFC forwards dynamic context information of PDCP layer and RLC layer for data transmission of a user to a target UE VNFC, in response to a request for migrating the user from the source UE VNFC to the target UE VNFC, so that process of the data transmission of the user is able to be continued at the second UE VNFC based on the dynamic context information. In an embodiment, a migration request may be sent from a load balancer to the source UE VNFC. The migration request may comprise any suitable information, such as the address of the target UE VNFC. Then, the user's context information forwarding to the target UE VNFC is triggered. Alternatively, the user's context information is forwarded to the target UE VNFC when it is fetched by the target UE VNFC.

Figure 11:
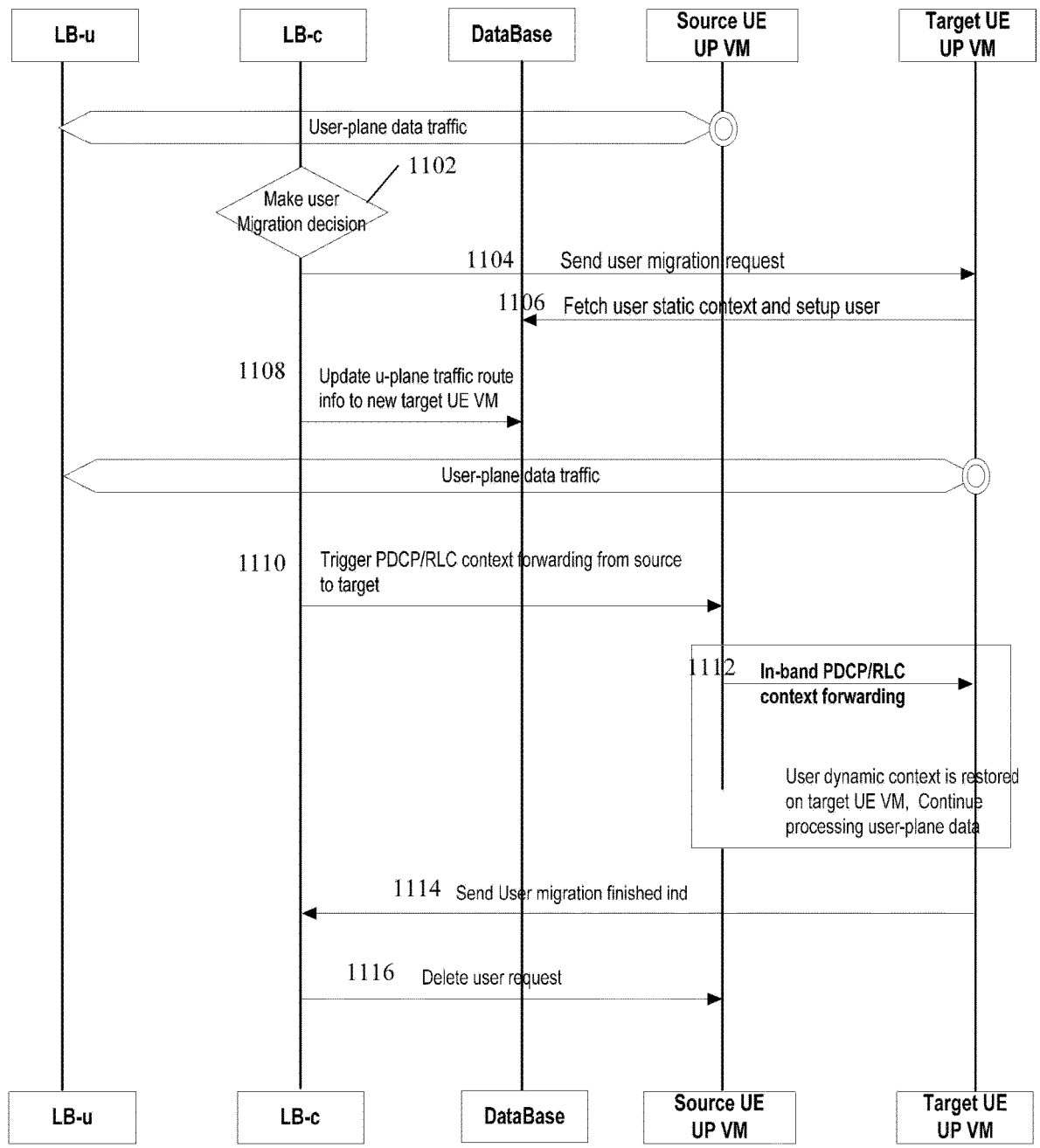
FIG. 11 is a diagram illustrating a procedure for user transfer according to an embodiment of the present disclosure.

FIG. 11 is a flow chart depicting a procedure for user transfer according to an embodiment of the present disclosure.

As depicted in FIG. 11, at block 1102, LB-c makes a user migration decision due to various reasons, for example load balancing, maintenance, upgrade, saving power consumption, etc.

At 1104, LB-c reads the user's context information from the session DB and sends a user migration request to a target UE VNFC. Or alternative, if there are multiple users to be migrated, LB-c can distribute user identities among new target UE VNFCs based on load situation, and tells each UE VNFC which indexes they shall access in the session database, so that the target UE VNFCs restore UE context information by themselves in parallel.

At 1106, the target UE VNFC may fetch the user's static context from the session database and setup the user.

At 1108, LB-c updates the traffic dispatch route, so that new incoming traffic may go to the target UE VNFC.

At 1110, LB-c sends message to the source UE VNFC for triggering RLC layer data/context forwarding from the source UE VNFC to the target UE VNFC.

At 1112, the source UE VNFC may perform in-band PDCP/RLC context forwarding. Then the target UE VNFC may restore the user's dynamic context and continue processing the user-plane data.

Once the data/context forwarding finishes and dynamic user context info is restored successfully on target UE VNFC, the target UE VNFC may send a user migration finish information to LB-c at 1114.

At 1116, LB-c may send a user deletion request to the source UE VNFC which may delete the user.

The user migration procedure happens inside the scope of load balancer, it has no impacts to outside RAP or core network, as from their perspectives, the communication addresses are unchanged, which are still the address of the load balancer. So, user live migration's impacts are limited inside the scope of load balancer and are self-contained.

Figure 12:
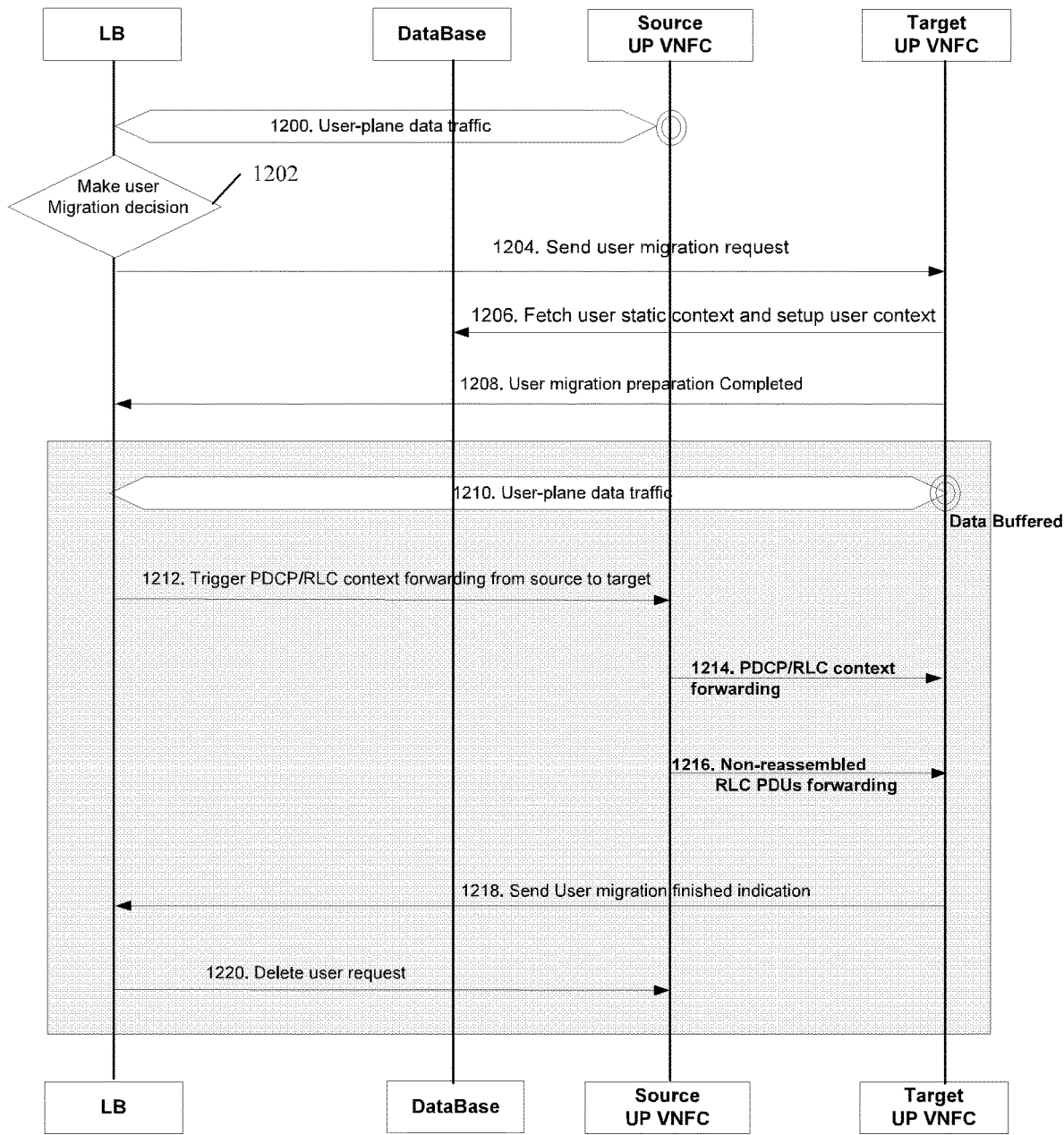
FIG. 12 is a diagram illustrating a procedure for user transfer according to another embodiment of the present disclosure.

FIG. 12 is a flow chart depicting a procedure for user transfer according to an embodiment of the present disclosure. As shown at 1200, while a user locates on a source UP VNFC, a load balancer may forward external data packets to a source UP VNFC for uplink/downlink transmission of the user.

At block 1202, the load balancer may make a decision of user transfer for the user, for example based on northbound control-plane request. For example, the decision is made according to a criteria associated with load balancing. For example, the decision may be triggered by load status of UP VNFCs becoming unbalanced, scaling out/in command, or power saving etc.

Then, the load balancer may send a migration request for the user to another UP VNFC which is selected as a target UP VNFC, as shown at 1204.

As shown at 1206, the target UP VNFC may retrieve static context information of the user from a database, such as a session database of the load balancer. Based on the static context information, the target UP VNFC can setup user. For example, the target UP VNFC can setup a logic user object for the user. The logic user object may comprise context for the user. Then, a response to the load balancer indicating completion of user transfer preparation may be send from the target UP VNFC to the load balancer, as shown at 1208.

The load balancer may send an indication to the source UP VNFC to start user transfer. As shown at 1212, the indication may further act as a trigger for forwarding PDCP/RLC context from the source UP VNFC to the target UP VNFC. Meanwhile, the load balancer may switch the incoming data packets to the target UP VNFC for uplink/downlink transmission of the user, as shown at 1210. The target UP VNFC buffers the incoming data packets at first.

In some embodiments, the source UP VNFC may deliver PDCP PDU data that have already been received for uplink/downlink transmission of the user by the source UP VNFC to a corresponding SGW (in case that the data packets are user-plane data) or corresponding upper layer RRC termination (in case that the data packets are RRC signaling).

For those RLC PDUs that can't be delivered, the source UP VNFC may forward dynamic PDCP/RLC context and these remaining RLC PDUs to the target UP VNFC, as shown at 1214 and 1216. In addition, the source UP VNFC may set an end mark to indicate if a RLC PDU data packet is the last one to be forwarded to the target UP VNFC.

The target UP VNFC receives the dynamic PDCP/RLC context and RLC PDUs, and then resumes the packet processing for data packets from source VNFC and the buffered ones discussed above with respect to step 1210.

Then, the target UP VNFC may send an indication to the load balancer indicating a completion of the user migration, as shown at 1218. The load balancer may trigger user deletion in the source UP VNFC as shown at 1220.

Through forwarding the context of RLC and PDCP protocol layer and RLC PDU packet between source and target VNFCs, embodiments of the disclosure may achieve zero data loss during user migration.

Figure 13:
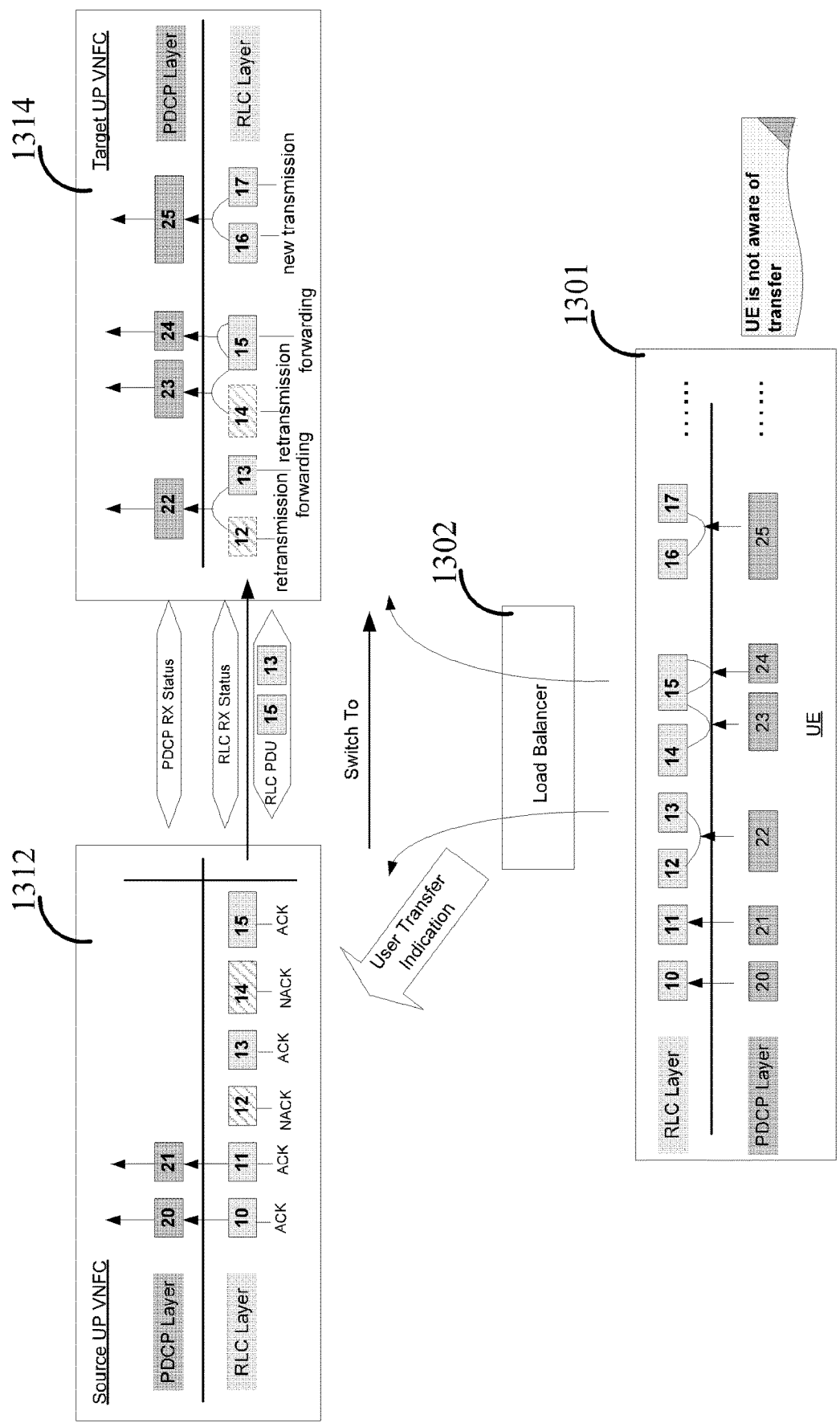
FIG. 13 illustrates uplink data transmission during user transfer according to an embodiment of the present disclosure.

FIG. 13 shows details of uplink data transmission during user migration. By example, a UE 1301 has sent RLC PDU with sequence from 10 to 15 to Cloud BTS, and the valid mode of the RLC layer is AM (Acknowledged Mode) mode.

The source UP VNFC 1312 has received RLC PDU 10, 11, 13, 15, and sent the acknowledge accordingly before context and data forwarding is triggered. A functionality entity on a RLC layer of the source UP VNFC 1312 may handle the received RLC PDU in a reception buffer, perform reassembling/reordering/ARQ, and deliver the reassembled RLC SDUs to upper layers in sequence.

A functionality entity on a PDCP layer of the source UP VNFC 1312 may process all received PDCP PDUs from the RLC layer, and deliver PDCP SDUs to upper layers.

When user transfer is triggered, for example in response to a user transfer indication from a load balance 1302, the source VNFC 1312 prepares and transfers context associated with latest transmission status on the PDCP layer and the RLC layer to the target VNFC 1314. In addition, an end mark indicating that RLC PDU 15 is the last RLC PDU can be further sent to the target VNFC. In case of the RLC layer is on AM mode, context information associated with PDCP status may comprise the following parameters: RX_HFN, Next_PDCP_RX_SN, and Last_submitted_PDCP_RX_SN.

These PDCP parameters can be defined according to 3GPP TS 36.323. For example, the variable RX_HFN indicates the HFN (Hyper Frame Number) value for the generation of the COUNT value used for the received PDCP PDUs for a given PDCP entity; the variable Next_PDCP_RX_SN indicates the next expected PDCP SN (Sequence Number) by the receiver for a given PDCP entity; and for PDCP entities for DRBs mapped on RLC AM, the variable Last_Submitted_PDCP_RX_SN indicates the SN of the last PDCP SDU delivered to the upper layers.

In case of the RLC layer is on AM mode, context information associated with RLC status may comprises the following parameters: VR(R), VR(MR), VR(X), VR(MS), VR(H) and ARQ info. These RLC parameters can be defined according to 3GPP TS 36.322. For example, VR(R) is receive state variable, VR(MR) is maximum acceptable receive state variable, VR(X) is t-reordering state variable, VR(MS) is maximum STATUS transmit state variable, and VR(H) is highest received state variable. ARQ info indicates information regarding the ARQ procedure.

At the source VNFC 1312, the PDCP SDUs which have been successfully reassembled from RLC PDU can be delivered to SGW or upper layers. If there exist any RLC PDU in buffer that are acknowledged but not reassembled, these non-reassembled RLC PDU will be forwarded to the target VNFC 1314 by the source VNFC 1312. In this particular example, the PDCP PDUs with SN 20 and 21 are reassembled from RLC PDUs 10 and 11, and thus PDCP SDUs from PDCP PDUs 20 and 21 can be delivered to corresponding SGW or upper layers. RLC PDUs 15 and 13 are not reassembled but acknowledged, and thus can be forwarded to the target VNFC 1314.

At the target UP VNFC side, if one migration-typed of user is setup on the target UP VNFC 1314, new incoming data of the uplink transmission for the user will be forwarded from the load balancer 1302 to the target VNFC 1314. The RLC PDUs received from the load balancer 1302 for this user will be buffered locally at the VNFC 1314. As shown in the particular example of FIG. 13, the retransmitted RLC PDUs 12, 14, and the newly transmitted RLC PDUs 16 and 17 can be taken as the new incoming data, and are buffered locally at the target VNFC 1314.

The target UP VNFC 1314 receives context information of the latest transmission status of RLC and PDCP protocol entities, which is forwarded from the source UP VNFC 1312 as described above.

The target UP VNFC 1314 may receive RLC PDUs (15, 13 in this example) forwarded from the source VNFC 1312, and save them into its local data buffers.

Based on the context information associated with data transmission in PDCP and RLC layers, the target UP VNFC 1314 restores the dynamic context into its RLC protocol entity and PDCP protocol entity. Then, based on the dynamic context, the target VNFC 1314 can start processing the buffered data (including RLC PDUs 13, 15 in this example) which is forwarded from the source VNFC 1312, and the incoming PDUs (including RLC PDUs 12, 14, 16, 17 in this example) from UE. As such, the uplink data transmission for the user can be continued without losing any data. Meanwhile, the UE 1301 is not aware of the switch from the source VNFC 1312 to the target VNFC 1314.

Figure 14:
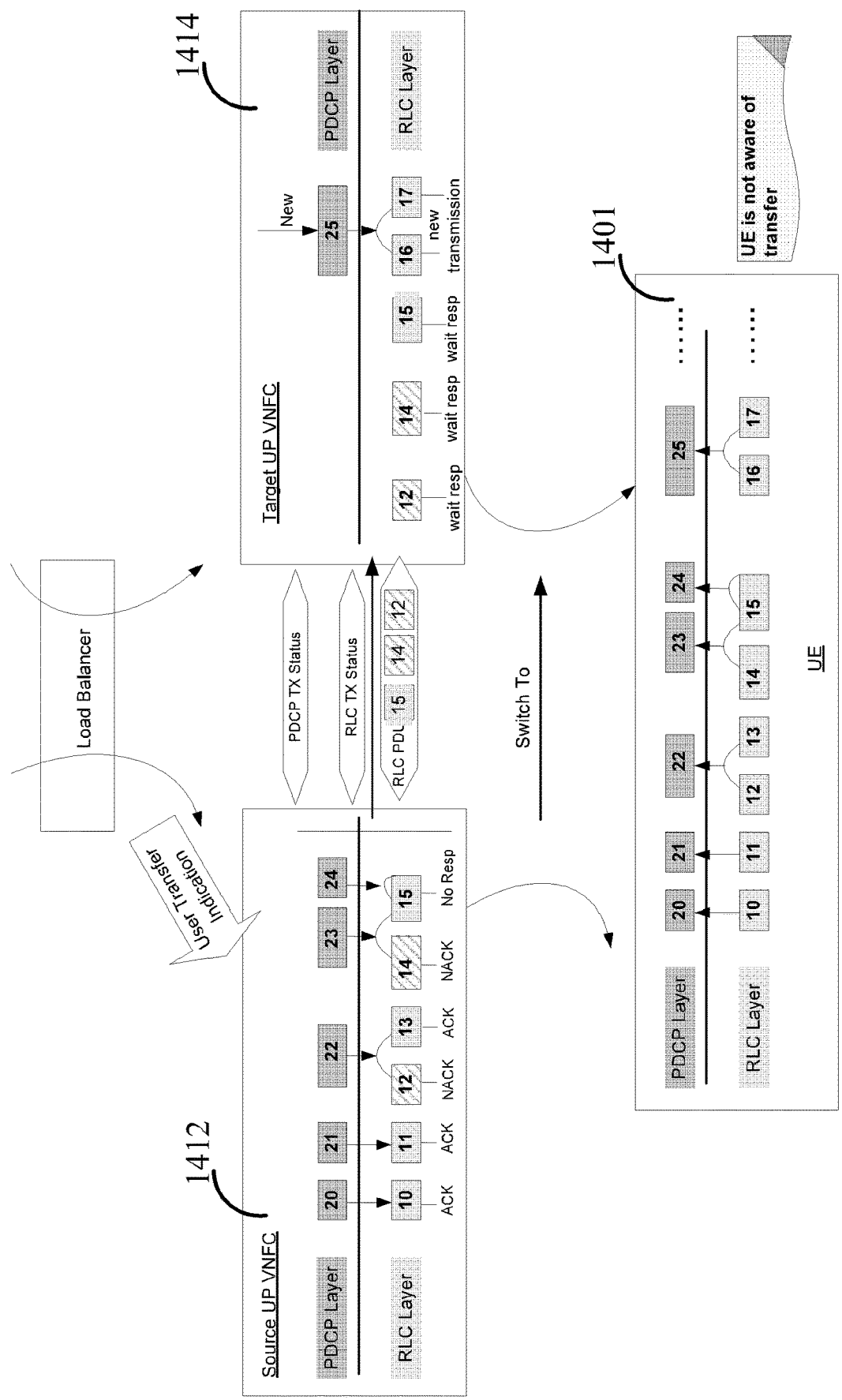
FIG. 14 illustrates downlink data transmission during user transfer according to an embodiment of the present disclosure.

FIG. 14 shows details of downlink data transmission during user migration. A load balancer may forward traffic data from a RRC layer or a SGW to a source VNFC 1412 at first. By example, PDCP PDUs with SN 20, 21, 22, 23, 24 have been delivered to a RLC layer. A functionality entity on the RLC layer on the source UP VNFC 1412 are arranged to handle data from its upper layer, and send RLC PDUs 10, 11, 12, 13, 14, 15 to its lower layers.

When user transfer is triggered, for example in response to a user transfer indication from a load balance 1404, the source UP VNFC's RLC entity has got acknowledge for RLC PDUs 10, 11 and 13, which indicates that the corresponding RLC PDUs have been delivered successfully. When user transfer is triggered, the source UP VNFC's RLC entity has got the NACK for RLC PDUs 12, 14, and it still waits for response of RLC PDU 15.

The source VNFC 1412 forwards un-acknowledged RLC PDU packet 12, 14 and 15 to the target VNFC 1414. The source VNFC 1412 may add an end mark for the last RLC PDU. Meanwhile, the source VNFC 1412 transfers the latest transmission status on the PDCP and RLC protocol layers to the target VNFC 1414. In case of the RLC layer is on AM mode, context information associated with PDCP status may comprise the parameters Next_PDCP_TX_SN and TX_HFN, and context information associated with RLC status may comprises VT(A), VT(MS), VT(S), POLL_SN, and ARQ info.

The PDCP parameters can be defined according to 3GPP TS 36.323. For example, the variable Next_PDCP_TX_SN indicates the PDCP SN of the next PDCP SDU for a given PDCP entity, and TX_HFN indicates the HFN value for the generation of the COUNT value used for PDCP PDUs for a given PDCP entity.

These RLC parameters can be defined according to 3GPP TS 36.322. For example, VT(A) is acknowledgement state variable, VT(MS) is maximum send state variable, VT(S) is send state variable, and POLL_SN is poll send state variable.

At the side of the target UP VNFC, if one migration-typed of user is setup on the target UP VNFC 1414, the target VNFC 1414 starts receiving data packets from the load balancer 1404, and buffers this user's PDCP SDUs at first. As shown in the particular example of FIG. 14, PDCP PDU 25 is the new incoming data and is buffered locally at the target VNFC 1414.

Meanwhile, the target VNFC 1414 receives context information of the latest transmission status of PDCP and RLC protocol entities, which is forwarded from the source VNFC 1412 as described above, and updates its PDCP/RCL protocol entities' state accordingly.

The target VNFC 1414 may further receive un-acknowledged RLC PDUs from the source VNFC 1412. For example, when the marked last RLC PDU arrives, the target VNFC's PDCP and RLC entities may start processing the un-acknowledged downlink data (e.g. RLC PDUs 12, 14, 15 in this example), and the new incoming downlink data (e.g. PDCP PDU 25) from a RRC layer or a SGW. As such, the downlink data transmission for the user can be continued without losing any data. Meanwhile, the UE 1401 is not aware of the switch from the source VNFC 1412 to the target VNFC 1414.

It should be noted although the embodiments of FIGS. 13 and 14 are described with regard to RLC AM mode, the idea of this disclosure is also applicable to other RLC mode. For example, for UM (Unacknowledged Mode) mode, considering the real-time service, there may be no need to transfer un-delivered RLC PDUs from a source VNFC to a target VNFC. According to rules of RLC UM mode, there's no re-transmission in RLC UM mode once a packet is not received correctly. Thus, even if the un-delivered RLC PDUs are not transferred from a source VNFC to a target VNFC during user transfer period, basically the impact to a service in RLC UM mode is very limited. But the context information of receiving and transmitting status on the PDCP and RLC layers can be synchronized between the source VNFC to the target VNFC in a similar way as those in AM mode.

It should be noted although a load balancer is deployed for triggering and controlling the user transfer in the embodiments of FIGS. 11-14, solutions of this disclosure can be also applicable in a system without deploying a load balancer, such as the LTE system shown in FIG. 1. For example, in some embodiments without a load balancer deployed in a system, some other control-plane software component or functionality entity is able to send a migration request, to trigger the user transfer as well.

In embodiments of the disclosure, context information associated with receiving and transmitting status on a RLC layer, and RLC packets can be transferred to a target VNFC During user migration, it avoids RLC re-establishment, thus can be transparent to UE. In embodiments of the disclosure, PDCP context and status can be transferred to a target VNFC, so that PDCP packet processing can be continued in the target VNFC. Accordingly, there may be no need to update and synchronize AS (Authentication and Security) information with UE. In embodiments of the disclosure, static and semi-static context of UE can be synchronized between two VNFCs via a database, so that the total time for the migration can be reduced remarkably.

With solutions of this disclosure, it is available to realized user migration inside Cloud VNF without causing any impacts to RAP, UE or SGW. Based on the user migration solutions, load balance for data-plane VNFC can be achieved. Upon of user migration and load balancing, native cloud features are feasible, such as scalability, recovery and high availability.

Figure 15:
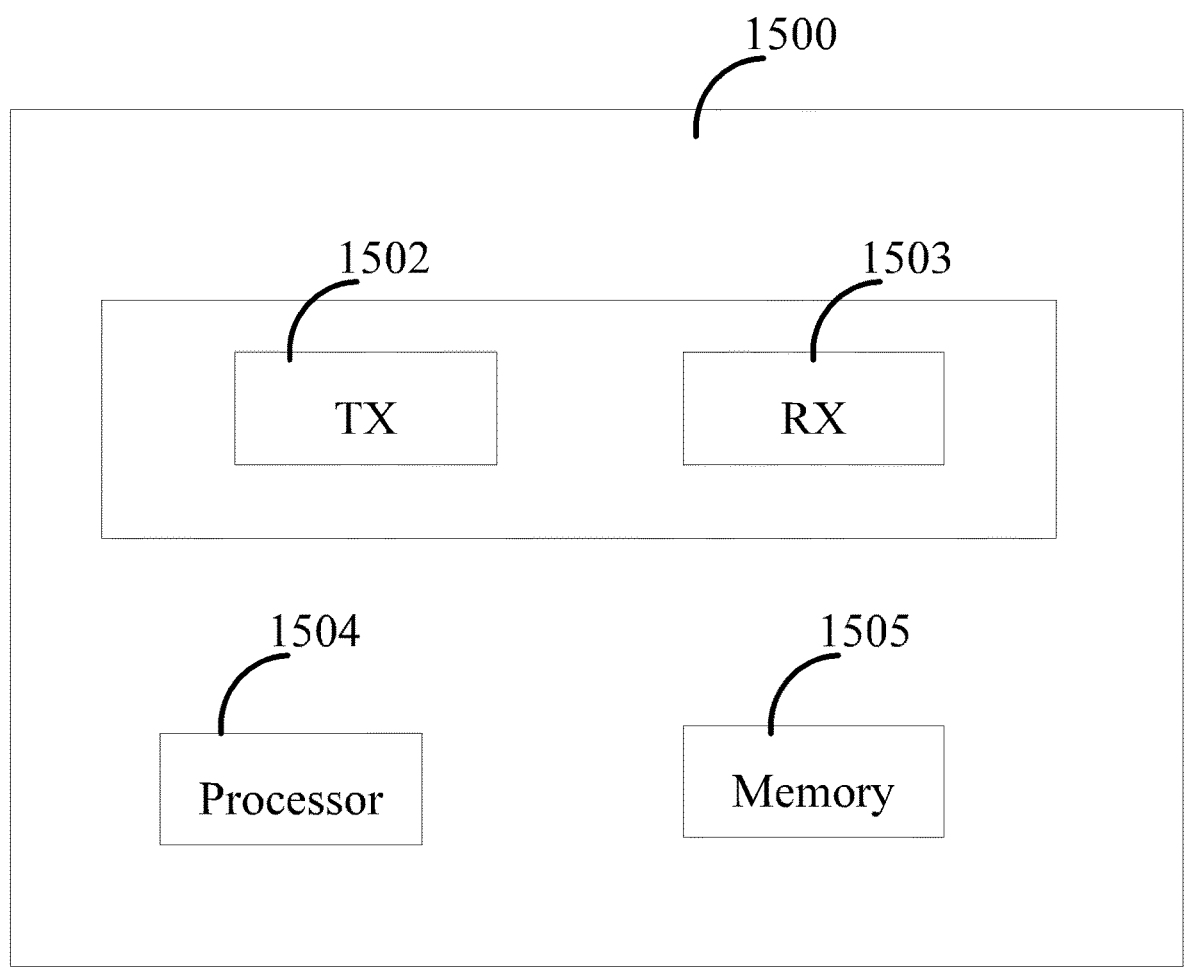
FIG. 15 is a block diagram illustrating an apparatus according to an embodiment of the disclosure.

FIG. 15 depicts an apparatus capable of load balancing in C-RAN as described above, wherein the apparatus may be implemented by or included in the load balancer. As shown in FIG. 15, the apparatus 1500 comprises a processing device 1504, a memory 1505, and a transceiver 1501 in operative communication with the processor 1504. The transceiver 1501 comprises at least one transmitter 1502 and at least one receiver 1503. While only one processor is illustrated in FIG. 15, the processing device 1504 may comprises one or more processors or multi-core processor(s). Additionally, the processing device 1504 may also comprise cache to facilitate processing operations. Computer-executable instructions can be loaded in the memory 1505 and, when executed by the processing device 1504, cause the apparatus 1500 to implement the above-described methods for user transfer in C-RAN.

According to an aspect of the disclosure it is provided a computer program product comprising at least one non-transitory computer-readable storage medium having computer-executable program instructions stored therein, the computer-executable instructions being configured to, when being executed, cause an apparatus to operate as described above.

According to an aspect of the disclosure it is provided a computer readable storage medium comprising instructions which when executed by at least one processor, cause the at least one processor to perform the method as described above.

For C-RAN, LB may be a new VNFC, can be deployed in VMs or containers. Load balancer as a common service, loose-coupled with application business logic, can be used for different C-RAN products. LB can use either software defined dispatcher, or SDN vSwitch to dispatch traffic. LB creates a UE service-oriental RAN software, with limited changes to original software, facilitate original software to get such as self-contained, self-scaling, self-healing and self-configured cloud native characteristics. LB facilitates RAN as a service.

It is noted that any of the components of load balancer and UE VNFC can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

The terms "computer program", "software" and "computer program code" are meant to include any sequences or human or machine cognizable steps which perform a function. Such program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME, Java Beans, etc.), Binary Runtime Environment (BREW), and the like.

The terms "memory" and "storage device" are meant to include, but not limited to, an electronic, magnetic, optical, electromagnetic, infrared, or semiconductor system, apparatus, or device, or any suitable combination of the foregoing. More specific examples (a non-exhaustive list) of the memory or storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

ABBREVIATIONS

At least some of the following abbreviations may be used in this disclosure. If there is an inconsistency between abbreviations, preference should be given to how it is used above.

RAT Radio Access Technology
RAN Radio Access Network
RAP Remote Access Point
LB Load Balancer
PaaS Platform as a Service
CaaS Container as a Service
IaaS Infrastructure as a Service
VNF Virtualized Network Function
VNFC Virtualized Network Function Components
SDN Software Defined Network
AM Acknowledged Mode
UM Unacknowledged Mode
TBD To Be Define
PS Packet Scheduler
D-PDU Data PDU
ZMQ Zero Message Queue
CCP Centralized Control Plane VNFC
DL Downlink
UE User Equipment
UL Uplink
UP User Plane
PHY Physical
PDU Protocol Data Unit
SDU Service Data Unit
SRB Signalling Radio Bearers
SGW Serving Gateway
DRB Data Radio Bearers
Ctrl control
NAS Non-access stratum

What is claimed is:

1. A method comprising:
user transfer in a cloud-radio access network, comprising:
in response to a request for migrating a user from a first user equipment virtualized network function component to a second user equipment virtualized network function component, receiving at the second user equipment virtualized network function component, dynamic context information of packet data convergence protocol layer, wherein the dynamic context information is updated during per packet processing and comprises packet data convergence protocol sequence number information, and radio link control layer buffer information for data transmission of the user from the first user equipment virtualized network function component; and
continuing process of the data transmission of the user at the second user equipment virtualized network function component based on the dynamic context information.

2. The method according to claim 1, further comprising:
receiving at the second user equipment virtualized network function component from a load balancer, the request for migrating the user from the first user equipment virtualized network function component to the second user equipment virtualized network function component,
wherein the migrating is determined according to criteria associated with load balancing.

3. The method according to claim 1, further comprising:
fetching at the second user equipment virtualized network function component, static context information for the user.

4. The method according to claim 1, further comprising:
receiving new incoming data packets for the data transmission of the user at the second user equipment virtualized network function component; and
buffering the new incoming data packets at the second user equipment virtualized network function component.

5. The method according to claim 1, further comprising:
receiving at the second user equipment virtualized network function component, protocol data units of the radio link control layer buffer which are not delivered by the first user equipment virtualized network function component for the data transmission of the user; and
further comprising at least one of:
for uplink data transmission of the user, receiving at the second user equipment virtualized network function component, protocol data units of the radio link control layer buffer which are acknowledged but not reassembled by the first user equipment virtualized network function component; or for downlink data transmission of the user, receiving at the second user equipment virtualized network function component, protocol data units of the radio link control layer buffer which are not acknowledged,
wherein continuing process of data transmission of the user comprises processing the received protocol data unit of the radio link control layer buffer which are not delivered by the first user equipment virtualized network function component, and processing the new incoming data packets.

6. The method according to claim 1, wherein the dynamic context information comprises parameters associated with transmission status of the packet data convergence protocol layer and the radio link control layer buffer.

7. The method according to claim 6, wherein for uplink data transmission of the user, the dynamic context information comprises at least one of:
parameters of packet data convergence protocol layer comprising at least one of:
a current hyper frame number for the generation of count values used for packet data convergence protocol data units received at the packet data convergence protocol layer from the radio link control layer buffer,
a next expected sequence number by the packet data convergence protocol layer, or
a sequence number of a last packet data convergence protocol service date unit delivered to the upper layers; or
parameters of the radio link control layer buffer comprising at least one of:
receive state variable,
maximum acceptable receive state variable,
t-reordering state variable,
maximum status transmit state variable, or
highest received state variable.

8. The method according to claim 6, wherein for downlink data transmission of the user, the dynamic context information comprises at least one of:
parameters of packet data convergence protocol layer comprising at least one of:
a sequence number of a next packet data convergence protocol service date unit, or
current hyper frame number for the generation of count values used for packet data convergence protocol data units transmitted at the packet data convergence protocol layer to the radio link control layer buffer; or
parameters of the radio link control layer buffer comprising at least one of:
acknowledgement state variable,
maximum send state variable,
send state variable, or
poll send state variable,
wherein the radio link control layer buffer is on acknowledged mode.

9. The method according to claim 1, wherein the dynamic context information comprises, an indication of a last protocol data unit of the radio link control layer buffer to be processed at the first user equipment virtualized network function component during the user transfer.

10. A non-transitory computer readable storage medium comprising instructions which when executed by at least one processor, cause the at least one processor to perform the method according to claim 1.

11. A method, comprising:
user transfer in a cloud-radio access network, comprising:
in response to a request for migrating a user from a first user equipment virtualized network function component to a second user equipment virtualized network function component, forwarding at the first user equipment virtualized network function component, dynamic context information of packet data convergence protocol layer, wherein the dynamic context information is updated during per packet processing and comprises packet data convergence protocol sequence number information, and radio link control layer buffer information for data transmission of the user to the second user equipment virtualized network function component, so that process of the data transmission of the user is able to be continued at the second user equipment virtualized network function component based on the dynamic context information.

12. The method according to claim 11, further comprising:
receiving at the first user equipment virtualized network function component from a load balancer, the request for migrating the user from the first user equipment virtualized network function component to the second user equipment virtualized network function component,
wherein the migrating is determined according to criteria associated with load balancing.

13. The method according to claim 11, further comprising:
forwarding at the first user equipment virtualized network function component to the second user equipment virtualized network function component, protocol data units of the radio link control layer buffer which are not delivered by the first user equipment virtualized network function component for the data transmission of the user.

14. The method according to claim 13, further comprising at least one of:
for uplink data transmission of the user, forwarding at the first user equipment virtualized network function component to the second user equipment virtualized network function component, protocol data units of the radio link control layer buffer which are acknowledged but not reassembled by the first user equipment virtualized network function component; or
for downlink data transmission of the user, forwarding at the first user equipment virtualized network function component to the second user equipment virtualized network function component, protocol data units of the radio link control layer buffer which are not acknowledged by the first user equipment virtualized network function component.

15. The method according to claim 11, wherein the context information comprises, parameters associated with transmission status of the packet data convergence protocol layer and the radio link control layer buffer.

16. The method according to claim 15, wherein for uplink data transmission of the user, the context information comprises at least one of:
parameters of packet data convergence protocol layer comprising at least one of:
a current hyper frame number for the generation of count values used for packet data convergence protocol data units received at the packet data convergence protocol layer from the radio link control layer buffer, a next expected sequence number by the packet data convergence protocol layer, or a sequence number of a last packet data convergence protocol service date unit delivered to the upper layers; or parameters of the radio link control layer buffer comprising at least one of:

receive state variable, maximum acceptable receive state variable, t-reordering state variable, maximum status transmit state variable, or highest received state variable.

17. The method according to claim 15, wherein for downlink data transmission of the user, the context information comprises at least one of:

parameters of packet data convergence protocol layer comprising at least one of:

a sequence number of a next packet data convergence protocol service date unit, or current hyper frame number for the generation of count values used for packet data convergence protocol data units transmitted at the packet data convergence protocol layer to the radio link control layer buffer; or parameters of the radio link control layer buffer comprising at least one of:

acknowledgement state variable, maximum send state variable, send state variable, or poll send state variable, wherein the radio link control layer buffer is on acknowledged mode.

18. The method according to claim 11, wherein the context information comprises, an indication of a last protocol data unit of the radio link control layer buffer to be processed at the first user equipment virtualized network function component during the user transfer.

19. An apparatus, comprising:

at least one processor; and at least one non-transitory memory, the memory containing instructions executable by the processor, whereby the apparatus is operative to perform:

user transfer in a cloud-radio access network, comprising:

in response to a request for migrating a user from a first user equipment virtualized network function component to a second user equipment virtualized network function component, receive at the second user equipment virtualized network function component, dynamic context information of packet data convergence protocol layer, wherein the dynamic context information is updated during per packet processing and comprises packet data convergence protocol sequence number information, and radio link control layer buffer information for data transmission of the user from the first user equipment virtualized network function component; and continue processing the data transmission of the user at the second user equipment virtualized network function component based on the dynamic context information.

20. An apparatus, comprising:

at least one processor; and at least one non-transitory memory, the memory containing instructions executable by the processor, whereby the apparatus is operative to perform:

user transfer in a cloud-radio access network, comprising:

in response to a request for migrating a user from a first user equipment virtualized network function component to a second user equipment virtualized network function component, forward at the first user equipment virtualized network function component, dynamic context information of packet data convergence protocol layer, wherein the dynamic context information is updated during per packet processing and comprises packet data convergence protocol sequence number information, and radio link control layer buffer information for data transmission of the user to the second user equipment virtualized network function component, so that process of the data transmission of the user is able to be continued at the second user equipment virtualized network function component based on the dynamic context information.

* * * * *